US010954466B2

(12) United States Patent
Sirak et al.

(10) Patent No.: US 10,954,466 B2
(45) Date of Patent: Mar. 23, 2021

(54) POLYMERIC-INORGANIC PARTICLES USEFUL AS LUBRICANT ADDITIVES

(71) Applicant: Evonik Operations GmbH, Essen (DE)

(72) Inventors: Sofia Sirak, Plymouth Meeting, PA (US); Can Metehan Turhan, Dieburg (DE); Daniel Neß, Hanau (DE); Jennifer Holtzinger, Frankfurt am Main (DE); Maximilian Cornelius, Frankfurt am Main (DE)

(73) Assignee: Evonik Operations GmbH, Essen (DE)

( * ) Notice: Subject to any disclaimer, the term of this patent is extended or adjusted under 35 U.S.C. 154(b) by 2 days.

(21) Appl. No.: 16/319,947

(22) PCT Filed: Jul. 24, 2017

(86) PCT No.: PCT/EP2017/068671
§ 371 (c)(1),
(2) Date: Jan. 23, 2019

(87) PCT Pub. No.: WO2018/019783
PCT Pub. Date: Feb. 1, 2018

(65) Prior Publication Data
US 2019/0264127 A1  Aug. 29, 2019

(30) Foreign Application Priority Data

Jul. 25, 2016 (EP) .................................... 16181051

(51) Int. Cl.
*C10M 155/02* (2006.01)
*C08F 220/68* (2006.01)
(Continued)

(52) U.S. Cl.
CPC ......... *C10M 155/02* (2013.01); *C08F 220/68* (2013.01); *C08F 292/00* (2013.01);
(Continued)

(58) Field of Classification Search
CPC ............. C10M 155/02; C10M 161/00; C10M 113/16; C10M 125/10; C10M 2201/06;
(Continued)

(56) References Cited

U.S. PATENT DOCUMENTS

| 4,202,780 A | 5/1980 | Brendle |
| 2011/0046294 A1 | 2/2011 | Minge et al. |

(Continued)

FOREIGN PATENT DOCUMENTS

| DE | 25 30 002 A1 | 1/1977 |
| DE | 10 2008 002 570 A1 | 12/2009 |

(Continued)

OTHER PUBLICATIONS

International Search Report and Written Opinion dated Sep. 4, 2017 in PCT/EP2017/068671 filed Jul. 24, 2017.
(Continued)

*Primary Examiner* — Taiwo Oladapo
(74) *Attorney, Agent, or Firm* — Oblon, McClelland, Maier & Neustadt, L.L.P.

(57) ABSTRACT

The invention relates to polymeric-inorganic nanoparticles and preparation processes thereof. The invention also relates to a powder, concentrate and lubricating composition comprising these polymeric-inorganic nanoparticles, to a method of dispersing nanoparticles in lubricating oil, as well as the use of these polymeric-inorganic particles in an oil lubricant formulation to reduce pour point, friction and wear.

26 Claims, 6 Drawing Sheets

(51) Int. Cl.
*C10M 125/10* (2006.01)
*C10M 161/00* (2006.01)
*C08F 292/00* (2006.01)
*C10M 113/16* (2006.01)
*C10N 20/04* (2006.01)
*C10N 20/06* (2006.01)
*C10N 20/00* (2006.01)
*C10N 30/06* (2006.01)
*C10N 40/04* (2006.01)
*C10N 40/08* (2006.01)
*C10N 50/00* (2006.01)
*C10N 70/00* (2006.01)

(52) U.S. Cl.
CPC ........ *C10M 113/16* (2013.01); *C10M 125/10* (2013.01); *C10M 161/00* (2013.01); *C10M 2201/06* (2013.01); *C10M 2201/062* (2013.01); *C10M 2201/105* (2013.01); *C10M 2201/14* (2013.01); *C10M 2203/1025* (2013.01); *C10M 2209/084* (2013.01); *C10M 2229/02* (2013.01); *C10M 2229/043* (2013.01); *C10N 2020/04* (2013.01); *C10N 2020/06* (2013.01); *C10N 2020/061* (2020.05); *C10N 2030/06* (2013.01); *C10N 2040/04* (2013.01); *C10N 2040/045* (2020.05); *C10N 2040/08* (2013.01); *C10N 2050/015* (2020.05); *C10N 2070/00* (2013.01)

(58) Field of Classification Search
CPC ...... C10M 2201/062; C10M 2209/084; C10M 2201/105; C10M 2229/043; C10M 2203/1025; C10M 2201/14; C10M 2229/02; C08F 292/00; C08F 220/68; C10N 2020/04; C10N 2020/06; C10N 2020/061; C10N 2030/06; C10N 2040/04; C10N 2040/08; C10N 2040/045; C10N 2050/015; C10N 2070/00
See application file for complete search history.

(56) References Cited

U.S. PATENT DOCUMENTS

2011/0118156 A1   5/2011   Rühle et al.
2013/0005619 A1   1/2013   Lee et al.
2013/0005881 A1*  1/2013   Yang ..................... C08L 51/10
                                                 524/145

FOREIGN PATENT DOCUMENTS

JP    2011137082 A  *  7/2011
KR    10-0795508 B1     1/2008

OTHER PUBLICATIONS

Jingfang Zhou, et al., "Tribological behavior and lubricating mechanism of Cu nanoparticles in oil," Tribology Letters, vol. 8, 2000, pp. 213-218.
Sunqing Qiu, et al., "Preparation of Ni Nanoparticles and Evaluation of Their Tribological Performance as Potential Additives in Oils," Journal of Tribology, vol. 123, Jul. 2001, pp. 441-443.
A. Hernandez Battez, et al., "The tribological behaviour of ZnO nanoparticles as an additive to PAO6," Wear, vol. 261, 2006, pp. 256-263.
De-Xing Peng, et al., "Size effects of $SiO_2$ nanoparticles as oil additives on tribology of lubricant," Industrial Lubrication and Tribology, vol. 62, No. 2, 2010, pp. 111-120.
D.X. Peng, et al., "Tribological properties of diamond and $SiO_2$ nanoparticles added in paraffin," Tribology International, vol. 42, 2009, pp. 911-917.
Henrik Böottcher, et al., "ATRP grafting from silica surface to create first and second generation of grafts," Polymer Bulletin, vol. 44, 2000, pp. 223-229.
Renpeng Gu, et al., "Synthesis of Polydopamine-Coated Graphene-Polymer Nanocomposites via RAFT Polymerization," Journal of Polymer Science, Part A: Polymer Chemistry, vol. 51, 2013, pp. 3941-3949.

* cited by examiner

| Example | After 24 hours | After 3 Weeks |
|---|---|---|
| Comparative example 5 | <br>+++ nearly complete sedimentation | <br>+++ nearly complete sedimentation |
| Example 6 | <br>o : no sedimentation | <br>Δ: very minor sedimentation |

POLYMERIC-INORGANIC PARTICLES USEFUL AS LUBRICANT ADDITIVES

RELATED APPLICATION

This application is a national stage entry of PCT/EP2017/068671, filed Jul. 24, 2017, which claims priority from European Patent Application No. 16181051.0, filed Jul. 25, 2016 which are incorporated by reference in their entirety.

TECHNICAL FIELD OF THE INVENTION

The invention relates to polymeric-inorganic nanoparticles and preparation processes thereof. The invention also relates to a powder, concentrate and lubricating composition comprising these polymeric-inorganic nanoparticles, to a method of dispersing nanoparticles in lubricating oil, as well as the use of these polymeric-inorganic particles in an oil lubricant formulation to reduce pour point, friction and wear.

BACKGROUND OF THE INVENTION

The present invention relates to the field of lubrication. Lubricants are compositions that reduce friction between surfaces. In addition to allowing freedom of motion between two surfaces and reducing mechanical wear of the surfaces, a lubricant also may inhibit corrosion of the surfaces and/or may inhibit damage to the surfaces due to heat or oxidation. Examples of lubricant compositions include, but are not limited to, engine oils, transmission fluids, gear oils, industrial lubricating oils, greases and metalworking oils.

Lubricants typically contain a base fluid and variable amounts of additives. Some additives in the lubricant formulation are used to reduce friction and wear between the contacts, which is important energy efficiency and durability of the device that is being lubricated.

In recent years, there has been a growing interest in the use of solid inorganic nanoparticles in lubricant formulations. These particles are especially useful to achieve boundary lubrication and keep surfaces separated. Studies have shown that the addition of nanoparticles can drastically improve wear and friction performance (Zhou et al, *Tribology Letters* 8, 213-218 (2000); Qiu et al. *J. Tribol.* 123 (3) 441-443 (2001).

However, creating a stable dispersion of nanoparticles is problematic. Most untreated inorganic nanoparticles, such as $TiO_2$ and $SiO_2$, are hydrophilic in nature and therefore form poor dispersions in oil or non-polar environments. Furthermore, the poor dispersion and weak forces of the particles draw particles together causing agglomeration and particle aggregates. These aggregates will lead to sedimentation that is unwanted and ineffective for the formulation.

In order to prevent this sedimentation and enhance dispersion, several techniques have been employed. These techniques include for instance the use of a dispersant moiety in the oil blend. By adding a dispersant moiety to an oil formulation, dispersion of nanoparticles can be improved. The dispersion agent or surfactant will have a hydrophilic part that can interact with the particle's surface and a hydrophobic tail that will assist in oil dispersion thereby forming micelles. One problem with the use of dispersant is that a careful equilibrium of dispersant to particle must exist or the dispersion will fall apart. Heat, energy, and shear forces that are present in a working machine or part can easily break this equilibrium. The disruption of the equilibrium will lead to sedimentation and agglomeration of particles. Furthermore, dispersant moieties are not suited well for non-polar environments. Typically, more polar base fluids need to be added so that the dispersant can be compatible. With increasing trends towards more non-polar fluids (Grp III or Group IV oils), many dispersants will not work well in oil formulations containing these oil.

US 2013/0005619 A1 describes the use of nanoparticles ($SiO_2$, $TiO_2$, alumina, and tin oxide) in lubricant formulation in order to reduce friction. In this work, a common dispersing agent, polyisobutenyl succinimide is used in order to properly disperse the particles. The resulting modified inorganic nanoparticle $SiO_2$ may be represented as in FIG. 7.

US 2011/0118156 uses ceramic nanoparticles, specifically $SiO_2$ with a special geometry, to reduce wear and friction. It is also shown that the addition of these particles helps in the load-bearing capability of materials. In order to disperse the particles, the base oil must be polar, e.g. water or polar natural oils such as soy bean or palm oil.

Battez et al. (*Wear* 261 (2006) 256-263) describe how ZnO particles in a PAO6 oil formulation can reduce the wear in extreme pressure (EP) conditions. In order to disperse and stabilize the particles, a dispersing agent was needed. Here, non-ionic dispersing agents containing polyhydroxystearic acid were used (Commercial names of the dispersing agents are Octacare DSP-OL100, and Octacare DSP-OL300). Even though a dispersion was created, sedimentation and agglomeration still occurred. The authors also showed that a formulation only containing the dispersing agent and base oil can provide a large improvement on wear, and in certain tests outperform the stabilized nanoparticle dispersion. In fact, unstable nanoparticle increased wear.

Another technique to prevent the sedimentation and enhance dispersion of particles is the chemical surface treatment of the particle. This technique may add hydrophobic or oleophilic character to the particle thereby helping dispersion. Since this method only covers part of the particle's surface, there is still a fair amount of hydrophilic character and this will still lead to agglomeration. The surface modification is accomplished by reacting some surface groups of the particle with small molecules or polymers suited for non-polar fluids. The resulting modified inorganic nanoparticle may be represented as in FIG. 7.

Peng et al. (*Industrial Lubrication and Tribology, Vol.* 62, Issue 2, 2010, pages 111-120 or *Tribology International*, 42, (2009), pages 911-917) explain the problem of sedimentation of nanoparticle in oil formulations. Peng et al. treat the surface of the particles with oleic acid. Sedimentation still occurs after some time.

For instance, Böttcher et al. (*Polymer Bulletin* 44, 223-229, 2000) and Gu et al (*Journal of Polymer Science, Part A: Polymer Chemistry*, 51, 2013, 3941-3949) describe the surface initiated polymerization method using controlled radical polymerization techniques on $SiO_2$ and graphene surfaces. Literature shows that polymers can be added to the surface via surface initiated polymerization. Just like in the previous examples, a small molecule is first reacted with the particles surface. Here, the molecule that is attached can react during a polymerization technique. One problem with this method is that crosslinking is likely to occur at high monomer conversions because of the high density of reactive sites on the particle surface. Another disadvantage to this method is that the polymer can only be attached at the chain end. Furthermore, if a controlled polymerization technique such as ATRP is used, then filtration of the catalyst is not possible by standard means because the particle cannot pass through the filter media. Lastly, the controlled polymerization method is costly and initiator attachment to the particle surface is tedious.

It was therefore an object of the present invention to provide anti-wear and anti-friction additives, which, in lubricant oil compositions, have a positive influence on friction and wear behaviors, while maintaining excellent stability over a long period of time in the lubricating oil.

SUMMARY OF THE INVENTION

After thorough investigation, the inventors of the present invention have surprisingly found that polymeric-inorganic nanoparticles as defined in claim 1 provide for improved wear and friction performances when added to a lubricant composition while being very well dispersed in the lubrication oil.

The polymeric-inorganic nanoparticles according to the invention are characterized in that one inorganic nanoparticle is covalently bonded to one or more polymers, each polymer comprising:

a) units derived from one or more compounds of formula (I)

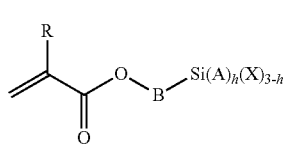

wherein R=H or $CH_3$
where $0 \leq h \leq 2$
$Si(A)_h(X)_{3-h}$ is a silane functional group,
A is a branched or unbranched C1 to C4 alkyl residue,
B is a branched or unbranched, aliphatic, aromatic or mixed aliphatic-aromatic C1 to C30 carbon-based group,
X is selected from H, Cl or a group OY, wherein Y is H or a C1 to C30 branched or unbranched alkyl-, alkenyl-, aryl-, or aralkyl- group, branched or unbranched C2 to C30 alkylether-group or branched or unbranched C2 to C30 alkylpolyether-group or a mixture thereof,
and
b) units derived from one or more alkyl (meth)acrylates, wherein the alkyl group comprises from 1 to 40 carbon atoms,
and wherein at least two units (a) of each polymer are covalently bonded to the inorganic nanoparticle.

In a preferred embodiment of the invention, the compound of formula (I) is selected from 3-(triethoxysilyl)propyl methacrylate, 3-(trimethoxysilyl)propyl methacrylate, 3-(trichlorosilyl)propyl methacrylate, even more preferably 3-(trimethoxysilyl)propyl methacrylate.

According to another preferred embodiment, each polymer further comprises comonomer units, preferably units selected from the group consisting of 2-(dimethylamino)ethyl methacrylate, dimethylaminopropyl methacrylamide or mixture thereof.

Especially preferred inorganic nanoparticles are selected from the group consisting of metal oxide nanoparticle, oxidized metal nitride nanoparticle, oxidized metal carbide nanoparticle, non-metal oxide nanoparticle or mixtures thereof.

Among the metal oxide nanoparticles, $SiO_2$ or $TiO_2$ are preferred.

According to a preferred embodiment of the invention, each polymer of the polymeric-inorganic nanoparticle comprises units b) derived from one or more alkyl (meth)acrylates selected from (b1) 0 to 30% by weight of units derived from one or more alkyl (meth)acrylate monomers of formula (II), based on the total weight of the monomer composition,

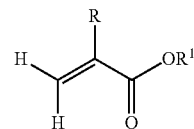

where R is hydrogen or methyl, $R^1$ means a linear, branched or cyclic alkyl residue with 1 to 8 carbon atoms,
and
(b2) 0 to 99.9% by weight, preferably 20% to 99.9% by weight, more preferably 40% to 99.9% by weight, of units derived from one or more alkyl (meth)acrylate monomers of formula (III), based on the total weight of the monomer composition,

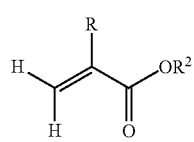

where R is hydrogen or methyl, $R^2$ means a linear, branched or cyclic alkyl residue with 9 to 15 carbon atoms, preferably with 12 to 15 carbon atoms, even more preferably with 12 to 14 carbon atoms,
and/or
(b3) 0 to 99.9% by weight, preferably 0 to 80% by weight, more preferably 0 to 70% by weight of units derived from one or more alkyl (meth)acrylate monomers of formula (IV), based on the total weight of the monomer composition,

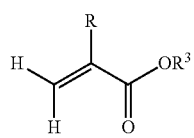

where R is hydrogen or methyl, $R^3$ means a linear, branched or cyclic alkyl residue with 16 to 40 carbon atoms, preferably with 16 to 22 carbon atoms, even more preferably with 16 to 18 carbon atoms, and
wherein each polymer comprises at least 10% by weight of either monomer units b2) or b3) or a mixture of both, based on the total weight of the monomer composition, and wherein the amounts of monomers a), b1), b2) and b3) are selected to sum up to 100% by weight of the mixture of monomers a), b1), b2) and b3).

Thus, according to a particular embodiment of the invention, alkyl (meth)acrylate monomers b) may correspond to alkyl (meth)acrylate monomers (b1) of formula (II), alkyl (meth)acrylate monomers (b2) of formula (III), alkyl (meth)acrylate monomers (b3) of formula (IV), and mixtures thereof.

In a preferred embodiment of the invention, the polymer of the polymeric-inorganic nanoparticle according to the invention comprises 0.1% by weight to 50% by weight, preferably 0.5% by weight to 40% by weight, more preferably 2% by weight to 35% by weight of units derived from monomer a) of Formula (I), based on the total weight of the monomer composition to prepare said polymer.

According to a preferred embodiment of the invention, the polymeric-inorganic nanoparticles of the invention are characterized in that one inorganic nanoparticle is covalently bonded to one or more polymers, each polymer comprising:

a) 0.1 to 50% by weight of units derived from one or more compounds of formula (I) preferably 0.5 to 40% by weight, based on the total weight of the monomer composition,

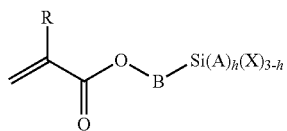
(I)

wherein R=H or CH$_3$
where 0≤h≤2
Si(A)$_h$(X)$_{3-h}$ is a silane functional group,
A is a branched or unbranched C1 to C4 alkyl residue,
B is a branched or unbranched, aliphatic, aromatic or mixed aliphatic-aromatic C1 to C30 carbon-based group,
X is selected from H, Cl or a group OY, wherein Y is H or a C1 to C30 branched or unbranched alkyl-, alkenyl-, aryl-, or aralkyl- group, branched or unbranched C2 to C30 alkylether-group or branched or unbranched C2 to C30 alkylpolyether-group or a mixture thereof,
and b2) 0 to 99.9% by weight, preferably 20 to 99.9% by weight, more preferably 40 to 99.9% by weight, of units derived from one or more alkyl (meth)acrylate monomers of formula (III), based on the total weight of the monomer composition,

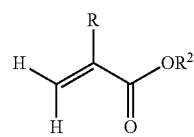
(III)

where R is hydrogen or methyl, R$^2$ means a linear, branched or cyclic alkyl residue with 9 to 15 carbon atoms, preferably with linear 12 to 15 carbon atoms, even more preferably with linear 12 to 14 carbon atoms,
and b3) 0 to 99.9% by weight, preferably 0 to 80% by weight, more preferably 0 to 70% by weight, of units derived from one or more alkyl (meth)acrylate monomers of formula (IV), based on the total weight of the monomer composition,

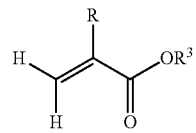
(IV)

where R is hydrogen or methyl, R$^3$ means a linear, branched or cyclic alkyl residue with 16-40 carbon atoms, preferably with linear 16 to 22 carbon atoms even more preferably linear 16 to 18 carbon atoms,
wherein each polymer comprises at least 10% by weight of either monomer units b2) or b3) or a mixture of both, based on the total weight of the monomer composition, and wherein the amounts of monomers a), b2) and b3) are selected to sum up to 100% by weight of the mixture of monomers a), b2) and b3).

The inventors have also found that some polymeric-inorganic nanoparticles have an additional property and are in particular also able to depress the pour point of a lubricating composition, while showing additionally very good friction and wear performances. Thus, according to a particular embodiment, the invention relates to these polymeric-inorganic nanoparticles, wherein one inorganic nanoparticle is covalently bonded to one or more polymers, each polymer comprising:

a) 0.1 to 50% by weight of units derived from one or more compounds of formula (I) preferably 0.5 to 40% by weight, based on the total weight of the monomer composition, (I)

wherein R=H or CH$_3$
where 0≤h≤2
Si(A)$_h$(X)$_{3-h}$ is a silane functional group,
A is a branched or unbranched C1 to C4 alkyl residue,
B is a branched or unbranched, aliphatic, aromatic or mixed aliphatic-aromatic C1 to C30 carbon-based group,
X is selected from H, Cl or a group OY, wherein Y is H or a C1 to C30 branched or unbranched alkyl-, alkenyl-, aryl-, or aralkyl- group, branched or unbranched C2 to C30 alkylether-group or branched or unbranched C2 to C30 alkylpolyether-group or a mixture thereof,
and b1) 0 to 30% by weight of units derived from one or more alkyl (meth)acrylate monomers of formula (II), preferably 0 to 5% by weight, based on the total weight of the monomer composition, (II)

where R is hydrogen or methyl, $R^1$ means a linear, branched or cyclic alkyl residue with 1 to 8 carbon atoms, and b2) 0 to 99.9% by weight, preferably 20 to 99.9% by weight, more preferably 40 to 99.9% by weight, even more preferably 40 to 75% by weight, of units derived from one or more alkyl (meth)acrylate monomers of formula (III), based on the total weight of the monomer composition,

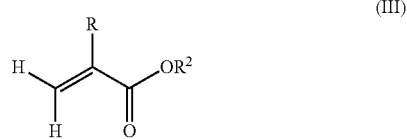

(III)

where R is hydrogen or methyl, $R^2$ means a linear, branched or cyclic alkyl residue with 9 to 15 carbon atoms, preferably with linear 12 to 15 carbon atoms, even more preferably with linear 12 to 14 carbon atoms, and b3) 0 to 99.9% by weight, preferably 0 to 80% by weight, more preferably 0 to 70% by weight, even more preferably 5 to 50% by weight, of units derived from one or more alkyl (meth)acrylate monomers of formula (IV), based on the total weight of the monomer composition,

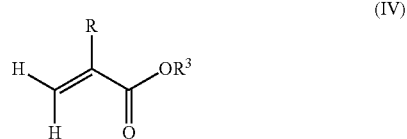

(IV)

where R is hydrogen or methyl, $R^3$ means a linear, branched or cyclic alkyl residue with 16 to 40 carbon atoms, preferably with linear 16 to 22 carbon atoms even more preferably linear 16 to 18 carbon atoms, wherein each polymer comprises at least 50% by weight of either monomer units b2) or b3) or a mixture of both, based on the total weight of the monomer composition, and wherein the amounts of monomers a), b1), b2) and b3) are selected to sum up to 100% by weight of the mixture of monomers a), b1), b2) and b3).

Thus, the present invention relates to the use of these polymeric-inorganic nanoparticles according to this particular embodiment to reduce the pour point of a lubricating composition.

The invention also relates to a pour point depressant comprising these polymeric-inorganic nanoparticles according to this particular embodiment.

In a preferred embodiment of the invention, each polymer covalently bonded to the inorganic nanoparticle has a weight average molecular weight of 5 000 g/mol to 200 000 g/mol, more preferably to 5 000 g/mol to 120 000 g/mol, being the polymer weight average molecular weights measured by gel permeation chromatography (GPC) calibrated using poly (methyl-methacrylate) standards and with tetrahydrofuran (THF) used as eluent.

In a preferred embodiment of the invention, the weight ratio between the nanoparticle and the one or more polymers covalently bonded to the inorganic nanoparticle of the polymeric-inorganic nanoparticle according to the invention is in the range of 1:0.02 to 1:1, preferably 1:0.05 to 1:1, and even more preferably 1:0.05 to 1:0.75.

According to another aspect, the present invention also relates to a process for preparing the polymeric-inorganic nanoparticle according to the present invention, the process comprising the following steps:

(i). in a first step, preparing a polymer according to the invention by polymerizing a monomer composition comprising monomers a) of formula (I) and monomers b) derived from one or more C1-C40 alkyl (meth) acrylates, (ii) in a second step, covalently bonding the polymer of step (i) with inorganic nanoparticles.

According to a preferred embodiment of the process, the silanization reaction of step (ii) is conducted in a base oil and/or an organic solvent, preferably API Group I, Group II, Group III or Group IV base oils, toluene, heptane, or mixtures thereof. Further possible base oils and organic solvents are described below.

According to a preferred embodiment of the invention, the reaction step (ii) is performed by mixing at high speed greater than 4000 RPM, and optionally conducting an ultrasonic treatment.

According to a preferred embodiment of the invention, the polymerization step (i) is performed using a reactive silane containing chain transfer agent, preferably (3-mercaptopropyl)trimethoxysilane. In this special case, the polymeric-inorganic nanoparticle is characterized in that the at least one polymer comprises a terminal polymer chain end derived from silane-containing chain transfer agent.

The present invention also relates to a dry powder comprising the polymeric-inorganic nanoparticles of the present invention. In this special case, the silanization reaction step to prepare the polymeric-inorganic nanoparticles is conducted in an organic solvent and said organic solvent is evaporated at the end of the silanization reaction resulting in the polymeric-inorganic nanoparticles in the form of a dry powder composed of a large number of very fine particles that may flow freely when shaken or tilted. The powder may comprise further additives added in the form of a powder. Possible further additives are listed below.

The present invention also relates to a concentrate comprising 10% to 90% by weight of polymeric-inorganic nanoparticles of the present invention, based on the total weight of the concentrate, and wherein the polymeric-inorganic nanoparticles are dispersed in base oil or an organic solvent. When the amounts of base oil and polymeric-inorganic nanoparticles do not sum up to 100% by weight of the total weight of the concentrate, then the remaining amount to sum up to 100% by weight of the total weight of the lubricating composition is made out of additional additives as described in the section below (item "additional additives").

The present invention also relates to a lubricating composition comprising polymeric-inorganic nanoparticles of the present invention.

According to a preferred embodiment of the lubricating composition, the lubricating composition comprises 50 to 99.99% by weight of at least one base oil and from 0.01 to 9.99% by weight, preferably 0.05 to 8% by weight, of polymeric inorganic nanoparticles of the invention, based on the total weight of the lubricating oil composition. When the amounts of base oil and polymeric-inorganic nanoparticles do not sum up to 100% by weight of the total weight of the lubricating composition, then the remaining amount to sum up to 100% by weight of the total weight of the lubricating composition is made out of additional additives as described in the section below (item "additional additives").

Another object of the invention is a method of dispersing inorganic nanoparticles in a lubricating oil composition comprising bonding covalently inorganic nanoparticles with one or more polymers, wherein polymeric-inorganic nanoparticles as defined in the present invention are obtained.

Another object of the invention is the use of the polymeric-inorganic particles according to the present invention in an oil lubricant formulation to reduce friction and/or to reduce wear.

The present invention also relates to an automatic transmission fluid, a continuously variable transmission fluid, an engine oil, a gear oil, a hydraulic oil, or a grease comprising polymeric-inorganic particles in accordance with the present invention.

BRIEF DESCRIPTION OF THE DRAWINGS

For the purpose of better illustrating the advantages and properties of the claimed polymeric-inorganic particles object of the invention, several graphs are attached as non-limiting examples:

DETAILED DESCRIPTION OF THE INVENTION

Polymeric-Inorganic Nanoparticles of the Invention

Figure 8A:
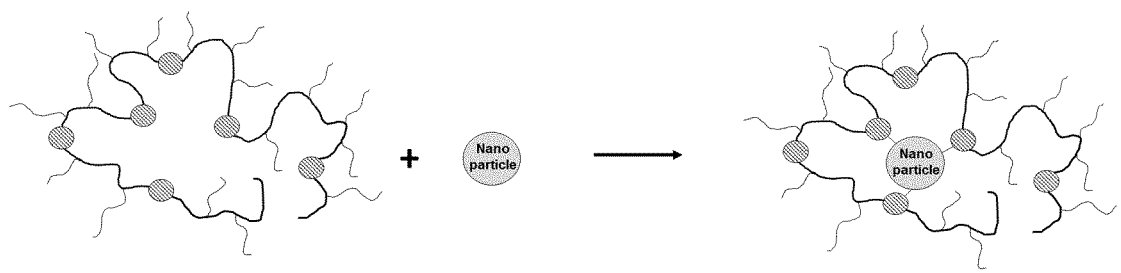
FIGS. 8a, 8b and 8c are some schematic representations of polymeric inorganic nanoparticles as claimed in the present invention.
Figure 8B:
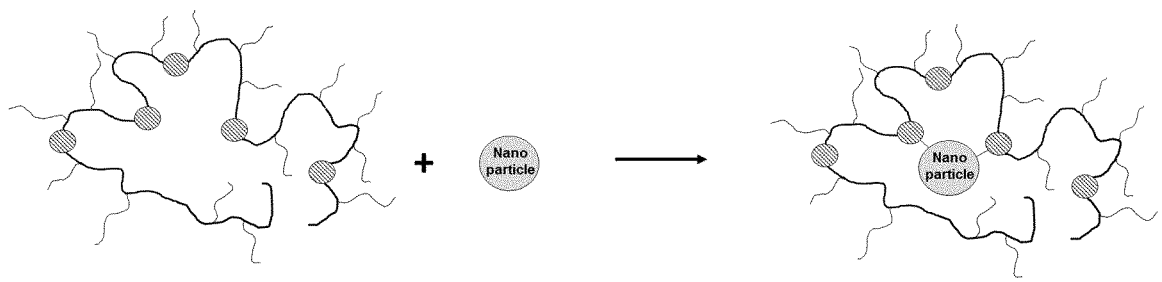
Figure 8C:
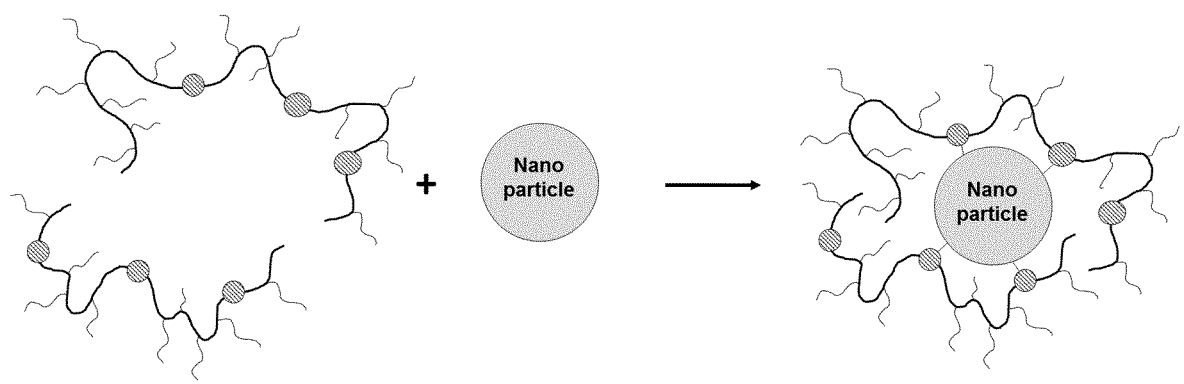

As explained above, the inventive polymeric-inorganic nanoparticles as defined in claim 1 are thus the result of covalent bondings of one inorganic nanoparticle with one or more polymers, each polymer having units derived from one or more C1-C40 alkyl (meth)acrylates and units of a monomer of formula (I) having reactive silane units, thus allowing one or more polymers to be covalently bonded to the hydroxyl functionalities present on the particle surface. The investigators of the present invention have surprisingly reached the conclusion that the silane-containing polymers are able to wrap around the particle surface through covalent bondings between the particle hydroxyl groups and the silane reactive sites of each polymer, thus creating a better shielding of the particle hydrophilic surface, thus allowing a better dispersancy of the particle in an unpolar base oil (see FIGS. 8a, 8b and 8c).

Figure 7:
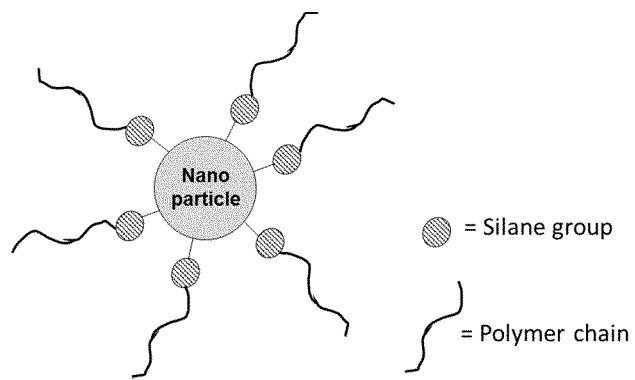
FIG. 7 is a schematic representation of inorganic nanoparticles, whose surfaces have been chemically modified with small molecules or polymers having only one anchoring point.

In contrast, in the classic approach as indicated in the background section above, where a dispersant agent is used or small molecules are grafted onto the surface of a particle, the interaction or attachment, respectively, is only at one anchor point at the end of a molecular chain or oligomer (see FIG. 7). The state of the art teaches such a single anchoring approach because one would expect the various silane groups to react with each other, thus leading to a gelation and cross-linking of the polymer, even before having proceeded with the bonding reaction to the inorganic particle.

Based on the teachings of the prior art, it did not seem effective to perform a reaction between an inorganic particle with a polymer having already many reactive silane sites because of the expectance of gelation and cross-linking side effects. It would have been an approach to make various modifications to single anchoring dispersant agents and silane terminal molecules to improve dispercancy.

The innovative idea of the investigators of the present invention is based on having chosen a multiple anchoring of each polymer by covalent bondings between the free hydroxyl groups present on the surface of the inorganic particles and numerous reactive silane sites of the silane-containing polymer, instead of a single anchoring as taught in the prior art.

According to the present invention, one or more reactive silane-containing polymers are now covalently attached to one inorganic nanoparticle through many reactive sites all along the polymer chain on the particle surface, thereby covering the surface of the nanoparticles, resulting in a polymeric-inorganic nanoparticle with an improved affinity towards non-polar solvents, such as base oils. In addition, the polymer comprises monomer units with long, oleophilic alkyl chains that provide extra solubility and dispersancy in oil (see FIGS. 8a, 8b and 8c).

Thus, the combination of monomer units having silane groups with monomer units of alkyl(meth)acrylate results in a silane-containing copolymer having several silane containing monomer units in its polymer chain, and wherein at least two silane functional group of the silane monomer units are covalently bonded to one inorganic nanoparticle. The resulting polymeric-inorganic nanoparticle provides an additive with synergistic improvement in dispersion stability and wear and friction performances as shown in the inventive examples provided below. The documents of the state of the art do not contemplate this option of reacting one or more silane-containing polymers with various reactive silane sites with one inorganic nanoparticle, nor do they consider to be able to drastically improve that way the dispersancy of such inorganic particles in oils, avoiding agglomeration of the inorganic nanoparticles in oils.

According to the present invention, the "one or more" polymers means that one inorganic nanoparticle may be covalently bonded to one polymer or to several polymers. When many polymers are covalently bonded to the same nanoparticle, then the polymers may be prepared with the same monomer composition, or be different polymers prepared with different monomer compositions.

According to the present invention, a polymeric-inorganic nanoparticle is the result of one inorganic nanoparticle, being bonded to at least one polymer, said polymer having at least two of its silane functional groups of monomer units (a) being covalently bonded to the one nanoparticle.

In a preferred embodiment of the invention, the weight ratio between the nanoparticle and the one or more polymers covalently bonded to the inorganic nanoparticle of the polymeric-inorganic nanoparticle according to the invention is in the range of 1:0.02 to 1:1, preferably 1:0.05 to 1:1, and even more preferably 1:0.05 to 1:0.75.

In addition, it should be also pointed out that the process for preparing the modified polymeric-inorganic nanoparticles of the invention is performed in a simple manner. First the polymer comprising units derived from one or more C1-C40 alkyl (meth)acrylates and units of a monomer of formula (I) is prepared following standard polymerization procedures as exemplified below. Then, after the first polymerization step is finalized with a monomer conversion of more than 98%, in a second reaction step, the resulting silane-containing polymers of the first step are mixed in solution with the inorganic nanoparticles, thus leading to the silanization of the inorganic nanoparticles with the polymers.

According to the preferred embodiment of the process, the silanization reaction step is conducted in a base oil leading to a concentrate or according to another preferred embodiment of the process, the silanization is conducted in an organic solvent leading to a dry powder of the polymeric inorganic nanoparticle of the invention.

The reaction temperature of the silanization reaction can be carried out from room temperature to 150° C. depending on the solvent and monomer of Formula (I).

Preferably the silanization reaction step is conducted by mixing the silane-containing polymer in oil with the inorganic nanoparticles at high speed greater than 4000 RPM.

Optionally an ultrasonic treatment is conducted simultaneously during the silanization reaction, or subsequently after the silanization second step. Using an ultrasonic treatment allows to deagglomerate any large particle agglomerates from the nanoparticle raw material powder, allowing all nanoparticles to get dispersed. The mixing of powders into liquids is a common step in the formulation of various products. The individual particles are held together by attraction forces of various physical and chemical nature, including van der Waals forces and liquid surface tension. This effect is stronger for higher viscosity liquids, such as polymers. The attraction forces must be overcome in order to deagglomerate and disperse the particles into liquid media. This cannot fully achieved by normal stirring, and thus the use of a high intensity ultrasonication The application of mechanical stress breaks the particle agglomerates apart. Particles are accelerated with the liquid jets and collide at high speeds. This makes ultrasound an effective means for the dispersing and deagglomeration, but also for the milling and fine grinding of micron-size and sub micron-size particles.

In the case of inorganic nanoparticles having a low number of hydroxyl functionalities on the surface of the particle, an additional reaction step is performed wherein the inorganic nanoparticle is oxidized at high temperature before proceeding with the anchoring reaction with the silane-containing polymer.

Inorganic Nanoparticles

According to the present invention, the inorganic nanoparticle (also referred to "particle" or "nanoparticle" in the present text) is a microscopic particle with at least one dimension less than 100 nm. This particle can either be of individual character or be present in an aggregated and/or agglomerated structure, in the latter the size of the primary particle is less than 100 nm at least in one dimension. The size of the aggregated/agglomerated structure can be between 50 and 600 nm (determined by scattering technologies e.g. DLS).

According to a preferred aspect of the present invention, the inorganic nanoparticle is a oxide of silicon, zirconium, cerium, titanium, aluminum, copper, calcium, magnesium, barium, iron, nickel, zinc, yttrium, boron or carbon. Preferred oxide nanoparticles are ZrO, CeO, $TiO_2$, $SiO_2$, $Al_2O_3$, CuO, CaO, MgO, BaO, $Fe_2O_3$, NiO, FeO, ZnO, $Y_2O_3$, boron oxides; B6O (boron suboxide) and mixture thereof.

According to a preferred aspect of the present invention, the inorganic nanoparticle is selected from oxidized nitrides of boron, aluminum, chromium, tungsten, or carbon and mixture thereof. Preferred oxidized nitride nanoparticles are oxidized hexagonal boron nitride (hBN) or oxidized cubic boron nitride (cBN). The oxidation of the nitride nanoparticles is performed by exposing the nanoparticles to a temperature range of 500 to 1200° C. during a period of time between 5 minutes and 24 hours.

According to another preferred aspect of the present invention, the inorganic nanoparticle is selected from carbides of silicon, aluminum, silico-oxy, tungsten, and mixture thereof.

According to another preferred aspect of the present invention, the inorganic nanoparticle is selected from multi or single layered carbonous structures; multi or single walled nanotubes, carbon fullerenes, graphene, carbon black, graphite and mixture thereof.

According to a preferred aspect of the present invention, the inorganic nanoparticle is a non-metal oxide. Preferred non-metal oxide nanoparticles are graphene oxide, graphite oxide and mixture thereof.

According to a preferred aspect of the present invention, the nanoparticle is selected from mixture of above mentioned structures.

Silane-Containing Polymers

The silane-containing polymers of the invention comprise:

a) units derived from one or more compounds of formula (I)

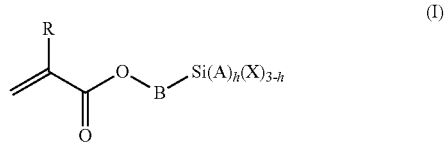

wherein R=H or $CH_3$
where 0≤h≤2
$Si(A)_h(X)_{3-h}$ is a silane functional group,
A is a branched or unbranched C1 to C4 alkyl residue,
B is a branched or unbranched, aliphatic, aromatic or mixed aliphatic-aromatic C1 to C30 carbon-based group,
X is selected from H, Cl or a group OY, wherein Y is H or a C1 to C30 branched or unbranched alkyl-, alkenyl-, aryl-, or aralkyl- group, branched or unbranched C2 to C30 alkylether-group or branched or unbranched C2 to C30 alkylpolyether-group or a mixture thereof, and b) units derived from one or more alkyl (meth)acrylates, wherein the alkyl group comprises from 1 to 40 carbon atoms.

Thus the resulting silane polyalkyl(meth)acrylate polymers comprises silane monomer units, as well as alkyl (meth)acrylate monomer units randomly distributed all along the main chain of the copolymer.

With regard to the silane monomer units a), examples of A are, among others, methyl, ethyl, n-propyl, isopropyl or n-butyl, tert-butyl alkyl groups.

With regard to the silane monomer units a), B is preferably selected from the group consisting of —CH$_2$—, —CH$_2$CH$_2$—, —CH$_2$CH$_2$CH$_2$—, —CH$_2$CH$_2$CH$_2$CH$_2$—, —CH(CH$_3$)—, —CH$_2$CH(CH$_3$)—, —C(CH$_3$)$_2$—, —CH(C$_2$H$_5$)—, —CH$_2$CH$_2$CH(CH$_3$)—, —CH$_2$CH(CH$_3$)CH$_2$—.

With regard to the silane monomer units a), Y is preferably selected from the group consisting of methyl, ethyl, n-propyl, isopropyl alkyl groups.

According to a very preferred embodiment, the silane monomer of formula (I) is selected from 3-(triethoxysilyl) propyl methacrylate, 3-(trimethoxysilyl)propyl methacrylate, 3-(trichlorosilyl)propyl methacrylate, even more preferably 3-(trim ethoxysilyl)propyl methacrylate.

The silane-containing polymer according to the present invention may comprise 0.1% by weight to 50% by weight, preferably 0.5% by weight to 40% by weight, more preferably 2% by weight to 35% by weight of units derived from silane monomer of Formula (I), based on the total weight of the monomer composition.

With regard to monomer units b), the term (meth)acrylates includes methacrylates and acrylates as well as mixtures thereof. These monomers are well known in the art. The alkyl residue of the ester compounds can be linear, cyclic or branched. The alkyl residue comprises 1 to 40, preferably 5 to 30 more preferably 9 to 15 carbon atoms, even more preferably 12 to 14 carbon atoms. The monomers can be used individually or as mixtures of different alkyl (meth)acrylate monomers.

According to an aspect of the present invention, the monomer units b) derived from one or more alkyl (meth) acrylates may comprise units b1) being derived from one or more alkyl (meth)acrylate monomers of formula (II).

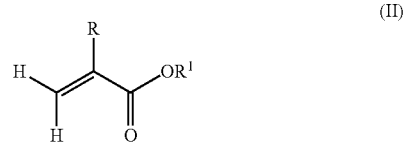

where R is hydrogen or methyl, $R^1$ means a linear, branched or cyclic alkyl residue with 1 to 8 carbon atoms, preferably 1 to 5, more preferably 1 to 3 carbon atoms.

Examples of monomers according to formula (II) are, among others, (meth)acrylates which derived from saturated alcohols such as methyl (meth)acrylate, ethyl (meth)acrylate, n-propyl (meth)acrylate, isopropyl (meth)acrylate, n-butyl (meth)acrylate, tert-butyl (meth)acrylate, pentyl (meth)acrylate and hexyl (meth)acrylate; cycloalkyl (meth) acrylates, like cyclopentyl (meth)acrylate, cyclohexyl (meth)acrylate, 2-ethylhexyl (meth)acrylate, heptyl (meth) acrylate, 2-tert-butylheptyl (meth)acrylate, n-octyl (meth) acrylate and 3-isopropylheptyl (meth)acrylate. Preferably, the polymer comprises units being derived from methyl methacrylate.

The silane-containing polymer according to the present invention may comprise 0% by weight to 40% by weight, preferably 0 to 30% by weight, preferably 0.1% by weight to 30% by weight, in particular 0.5% by weight to 20% by weight of units b1) derived from one or more alkyl (meth) acrylate monomers of formula (II) based on the total weight of the monomer composition.

According to another aspect of the present invention, the monomer units b) derived from one or more alkyl (meth) acrylates may comprise units b2) being derived from one or more alkyl (meth)acrylate monomers of formula (III)

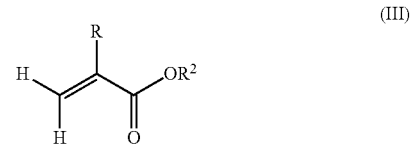

where R is hydrogen or methyl, $R^2$ means a linear, branched or cyclic alkyl residue with 9 to 15 carbon atoms, more preferably a linear, branched or cyclic alkyl residue with 12 to 15 carbon atoms, even more preferably a linear, branched or cyclic alkyl residue with 12 to 14 carbon atoms.

Examples of monomers b2) according to formula (III) include (meth)acrylates that derive from saturated alcohols, such as nonyl (meth)acrylate, decyl (meth)acrylate, isodecyl (meth)acrylate, undecyl (meth)acrylate, 5-methylundecyl (meth)acrylate, n-dodecyl (meth)acrylate, 2-methyldodecyl (meth)acrylate, tridecyl (meth)acrylate, 5-methyltridecyl (meth)acrylate, n-tetradecyl (meth)acrylate, pentadecyl (meth)acrylate; (meth)acrylates which derive from unsaturated alcohols, for example oleyl (meth)acrylate; cycloalkyl (meth)acrylates such as cyclohexyl (meth)acrylate having a ring substituent, like tert-butylcyclohexyl (meth)acrylate and trimethylcyclohexyl (meth)acrylate, bornyl (meth)acrylate and isobornyl (meth)acrylate.

The silane-containing polymer according to the present invention may comprise at least 10% by weight, especially at least 20% by weight of units derived from one or more alkyl(meth)acrylates of formula (III) based on the total weight of the alkyl (meth)acrylates. According to a preferred aspect of the present invention, the units derived from alkyl (meth)acrylates comprise about 20% by weight to 99.9% by weight, more preferably about 40% by weight to 99.9% by weight, even more preferably about 70% by weight to 99.9% by weight of units derived from monomers according to formula (III) based on the total weight of the monomer composition.

Furthermore, the monomer units b) derived from one or more alkyl (meth)acrylates may comprise units b3) being derived from one or more alkyl (meth)acrylate monomers of formula (IV)

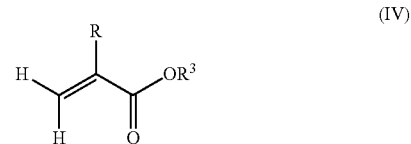

where R is hydrogen or methyl, $R^3$ means a linear, branched or cyclic alkyl residue with 16 to 40 carbon atoms, preferably with 16 to 30 carbon atoms, more preferably with 16 to 20 carbon atoms.

Examples of monomer b3) of formula (IV) include (meth) acrylates which derive from saturated alcohols, such as hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth) acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate, behenyl (meth)acrylate and/or eicosyltetratriacontyl (meth)acrylate; cycloalkyl (meth)acrylates such as 2,4,5-tri-t-butyl-3-vinylcyclohexyl (meth)acrylate, 2,3,4,5-tetra-t-butylcyclohexyl (meth)acrylate.

The silane-containing polymer according to the present invention may comprise 0% by weight to 99.9% by weight, preferably 0 to 80% by weight, more preferably 0 to 70% by weight, even more preferably 0.1% by weight to 30% by weight, in particular 0.5% by weight to 20% by weight of units b3) derived from one or more alkyl (meth)acrylate monomers of formula (III) based on the total weight of the monomer composition.

According to a preferred aspect of the invention, the units b) derived from one or more alkyl (meth)acrylates comprise b1) units derived from one or more alkyl (meth)acrylate monomers of formula (II)

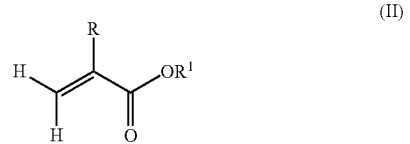

where R is hydrogen or methyl, $R^1$ means a linear, branched or cyclic alkyl residue with 1 to 8 carbon atoms,
and
b2) units derived from one or more alkyl (meth)acrylate monomers of formula (III)

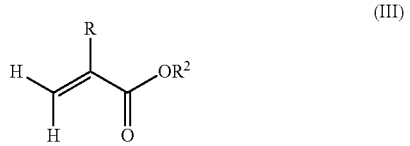

where R is hydrogen or methyl, $R^2$ means a linear, branched or cyclic alkyl residue with 9 to 15 carbon atoms, preferably with 12 to 15 carbon atoms, even more preferably with 12 to 14 carbon atoms,
and/or
b3) units derived from one or more alkyl (meth)acrylate monomers of formula (IV)

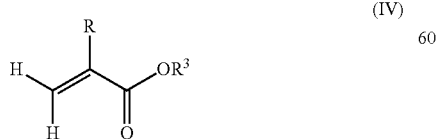

where R is hydrogen or methyl, $R^3$ means a linear, branched or cyclic alkyl residue with 16-40 carbon atoms, preferably with 16 to 30 carbon atoms, more preferably with 16 to 22 carbon atoms, even more preferably with 16 to 18 carbon atoms.

According to another preferred aspect of the invention, the units b) derived from one or more alkyl (meth)acrylates comprise b1) 0 to 40% by weight, based on the total weight of the monomer composition, preferably 0 to 30% by weight preferably 0 to 20% by weight, even more preferably 0 to 10% by weight of units, even more preferably 0 to 5% by weight, derived from one or more alkyl (meth) acrylate monomers of formula (II)

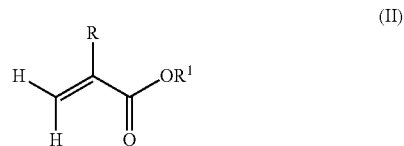

where R is hydrogen or methyl, $R^1$ means a linear, branched or cyclic alkyl residue with 1 to 8 carbon atoms,
and
b2) 0 to 99.9% by weight, based on the total weight of the monomer composition, preferably 20 to 99.9% by weight, more preferably 40 to 99.9% by weight, even more preferably 60 to 99.9% by weight, of units derived from one or more alkyl (meth)acrylate monomers of formula (III)

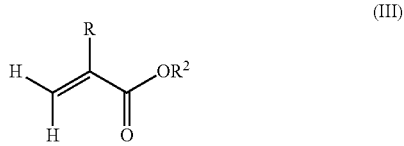

where R is hydrogen or methyl, $R^2$ means a linear, branched or cyclic alkyl residue with 9 to 15 carbon atoms, preferably with 12 to 15 carbon atoms, even more preferably with 12 to 14 carbon atoms,
and
(b3) 0 to 99.9% by weight, preferably 0 to 80% by weight, more preferably 0 to 70% by weight, even more preferably 0 to 40% by weight, based on the total weight of the monomer composition, even more preferably 0 to 30% by weight, of units derived from one or more alkyl (meth)acrylate monomers of formula (IV)

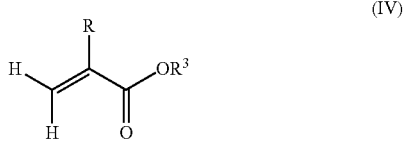

where R is hydrogen or methyl, $R^3$ means a linear, branched or cyclic alkyl residue with 16-40 carbon atoms, preferably with 16 to 30 carbon atoms, more preferably with 16 to 22 carbon atoms, even more preferably with 16 to 18 carbon atoms
wherein the polymer comprises at least 10% by weight of either monomer units b2) or b3) or a mixture of both, based on the total weight of the monomer composition, and wherein the amounts of monomers a), b1), b2) and b3) are selected to sum up to 100% by weight of the mixture of monomer units a), b1), b2) and b3).

As aforementioned, the polymer comprises units a) derived from silane monomer of Formula (I) and units b) derived from one or more alkyl (meth)acrylate monomers of Formula (II), (III) and (IV). The amounts of monomers units a) derived from silane monomer of Formula (I) and monomer units b) derived from one or more alkyl (meth)acrylate monomers of Formula (II), (III) and (IV) are selected to sum up to 100% by weight of the mixture of monomer units a) derived from silane monomer of Formula (I) and monomer units b) derived from one or more alkyl (meth)acrylate monomers of Formula (II), (III) and (IV). This characteristic for the amounts of monomers of Formula (I), (II), (III), and (IV) applies for each monomer mixture described above.

According to another preferred embodiment of the present invention, the silane-containing polymer comprises a) 0.1 to 50% by weight of units derived from one or more compounds of formula (I), preferably 0.5 to 40% by weight, based on the total weight of the monomer composition,

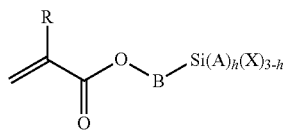

(I)

wherein R=H or CH$_3$
where 0≤h≤2
Si(A)$_h$(X)$_{3-h}$ is a silane functional group,
A is a branched or unbranched C1 to C4 alkyl residue,
B is a branched or unbranched, aliphatic, aromatic or mixed aliphatic-aromatic C1 to C30 carbon-based group,
X is selected from H, Cl or a group OY, wherein Y is H or a C1 to C30 branched or unbranched alkyl-, alkenyl-, aryl-, or aralkyl- group, branched or unbranched C2 to C30 alkylether-group or branched or unbranched C2 to C30 alkylpolyether-group or a mixture thereof,
and
b2) 0 to 99.9% by weight, preferably 20 to 99.9% by weight, even more preferably 40 to 99.9% by weight, of units derived from one or more alkyl (meth)acrylate monomers of formula (III), even more preferably 40 to 75% by weight, based on the total weight of the monomer composition,

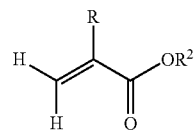

(III)

where R is hydrogen or methyl, R$^2$ means a linear, branched or cyclic alkyl residue with 9 to 15 carbon atoms, preferably with linear 12 to 15 carbon atoms, even more preferably with linear 12 to 14 carbon atoms, and/or b3). 0 to 99.9% by weight of units derived from one or more alkyl (meth)acrylate monomers of formula (IV), preferably 0 to 80% by weight, more preferably 0 to 60% by weight, even more preferably 5 to 50% by weight, based on the total weight of the monomer composition,

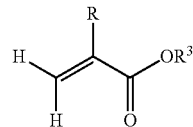

(IV)

where R is hydrogen or methyl, R$^3$ means a linear, branched or cyclic alkyl residue with 16 to 40 carbon atoms, preferably with linear 16 to 22 carbon atoms even more preferably linear 16 to 18 carbon atoms,
wherein the polymer comprises at least 10% by weight of either monomer units b2) or b3) or a mixture of both, based on the total weight of the monomer composition, and
wherein the amounts of monomers a), b2) and b3) are selected to sum up to 100% by weight of the mixture of monomer units a), b2) and b3).

According to a particular embodiment of the invention, the polymers covalently bonded to the inorganic nanoparticle comprise at least 50% by weight of either monomer units b2) or b3) or a mixture of both, based on the total weight of the monomer composition. Indeed, it has been found that when such silane-containing polymer reacts with one inorganic nanoparticle, then the resulting polymeric-inorganic nanoparticle not only has wear and friction performances, but is also able to reduce the pour point of lubricating oils.

As an optional component, the polymer may contain units derived from one or more comonomers or combination thereof.

These comonomers include hydroxyalkyl (meth)acrylates like 3-hydroxypropyl (meth)acrylate, 3,4-dihydroxybutyl (meth)acrylate, 2-hydroxyethyl (meth)acrylate, 2 hydroxypropyl (meth)acrylate, 2,5-dimethyl-1,6-hexanediol (meth)acrylate, 1,10 decanediol (meth)acrylate;

aminoalkyl (meth)acrylates and aminoalkyl (meth)acrylamides like N-(3-dimethyl-aminopropyl)methacrylamide, 3-diethylaminopentyl (meth)acrylate, 3-dibutyl-aminohexadecyl (meth)acrylate;

nitriles of (meth)acrylic acid and other nitrogen-containing (meth)acrylates like N (methacryloyloxyethyl)diisobutylketimine, N-(methacryloyloxyethyl)dihexadecylketimine, (meth)acryloylamidoacetonitrile, 2-methacryloyloxyethylmethylcyanamide, cyanomethyl (meth)acrylate;

aryl (meth)acrylates like benzyl (meth)acrylate or phenyl (meth)acrylate, where the acryl residue in each case can be unsubstituted or substituted up to four times;

carbonyl-containing (meth)acrylates like 2-carboxyethyl (meth)acrylate, carboxymethyl (meth)acrylate, oxazolidinylethyl (meth)acrylate, N-methyacryloyloxy)-formamide, acetonyl (meth)acrylate, N-methacryloylmorpholine, N-methacryloyl-2 pyrrolidinone, N-(2-methyacryloxyoxyethyl)-2-pyrrolidinone, N-(3-methacryloyloxy-propyl)-2-pyrrolidinone, N-(2-methyacryloyloxypentadecyl(-2-pyrrolidinone, N (3 methacryloyloxyheptadecyl-2-pyrrolidinone;

(meth)acrylates of ether alcohols like tetrahydrofurfuryl (meth)acrylate, methoxyethoxyethyl (meth)acrylate, 1-butoxypropyl (meth)acrylate, cyclohexyloxyethyl (meth)acrylate, propoxyethoxyethyl (meth)acrylate, benzyloxyethyl (meth)acrylate, furfuryl (meth)acrylate, 2-butoxyethyl (meth)acrylate, 2-ethoxy-2-ethoxyethyl (meth)acrylate, 2-methoxy-2-ethoxypropyl (meth)acrylate, ethoxylated (meth)acrylates, 1-ethoxybutyl (meth)acrylate, methoxyethyl (meth)acrylate, 2-ethoxy-2-ethoxy-2-ethoxyethyl (meth)acrylate, esters of (meth)acrylic acid and methoxy polyethylene glycols;

(meth)acrylates of halogenated alcohols like 2,3-dibromopropyl (meth)acrylate, 4 bromophenyl (meth)acrylate, 1,3-dichloro-2-propyl (meth)acrylate, 2-bromoethyl (meth)acrylate, 2-iodoethyl (meth)acrylate, chloromethyl (meth)acrylate;

oxiranyl (meth)acrylate like 2, 3-epoxybutyl (meth)acrylate, 3,4-epoxybutyl (meth)acrylate, 10,11 epoxyundecyl (meth)acrylate, 2,3-epoxycyclohexyl (meth)acrylate, oxiranyl (meth)acrylates such as 10,11-epoxyhexadecyl (meth)acrylate, glycidyl (meth)acrylate;

phosphorus-, boron- and/or silicon-containing (meth)acrylates like 2-(dimethyl-phosphato)propyl (meth)acrylate, 2-(ethylphosphito)propyl (meth)acrylate, 2 dimethylphosphinomethyl (meth)acrylate, dimethylphosphonoethyl (meth)acrylate, diethylmethacryloyl phosphonate, dipropylmethacryloyl phosphate, 2 (dibutylphosphono)ethyl (meth) acrylate, 2,3-butylenemethacryloylethyl borate, methyldiethoxymethacryloylethoxysiliane, diethylphosphatoethyl (meth)acrylate;

sulfur-containing (meth)acrylates like ethylsulfinylethyl (meth)acrylate, 4-thio-cyanatobutyl (meth)acrylate, ethylsulfonylethyl (meth)acrylate, thiocyanatomethyl (meth)acrylate, methylsulfinylmethyl (meth)acrylate, bis(methacryloyloxyethyl) sulfide;

heterocyclic (meth)acrylates like 2-(1-imidazolyl)ethyl (meth)acrylate, 2-(4-morpholinyl)ethyl (meth)acrylate and 1-(2-methacryloyloxyethyl)-2-pyrrolidone;

maleic acid and maleic acid derivatives such as mono- and diesters of maleic acid, maleic anhydride, methylmaleic anhydride, maleinimide, methylmaleinimide;

fumaric acid and fumaric acid derivatives such as, for example, mono- and diesters of fumaric acid;

vinyl halides such as, for example, vinyl chloride, vinyl fluoride, vinylidene chloride and vinylidene fluoride;

vinyl esters like vinyl acetate;

vinyl monomers containing aromatic groups like styrene, substituted styrenes with an alkyl substituent in the side chain, such as alpha-methylstyrene and alpha-ethylstyrene, substituted styrenes with an alkyl substituent on the ring such as vinyltoluene and p-methylstyrene, halogenated styrenes such as monochlorostyrenes, dichlorostyrenes, tribromostyrenes and tetrabromostyrenes;

heterocyclic vinyl compounds like 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl and isoprenyl ethers;

methacrylic acid and acrylic acid.

The proportion of comonomers can be varied depending on the use and property profile of the polymer. In general, this proportion may be in the range from 0 to 20% by weight, preferably from 0.01 to 20% by weight, more preferably from 0.1 to 10% by weight, even more preferably from 0.1 to 5% by weight, based on the total weight of the monomer composition.

The silane-containing polymer comprising units a) of a silane monomer of formula (I) and units b) derived from one or more C1-C40 alkyl (meth)acrylates preferably have a weight average molecular weight Mw in the range of 5 000 to 200 000 g/mol, preferably of 5 000 to 150 000 g/mol, even more preferably 10 000 to 120 000 g/mol, and more preferably 10 000 to 80 000 g/mol determined by gel permeation chromatography (GPC) using a poly(methyl methacrylate) polymer as standard and THF as eluent.

The preparation of the silane-containing polymer comprising units a) of a silane monomer of formula (I) and units b) derived from one or more C1-C40 alkyl (meth)acrylates from the above-described monomers is known per se. Thus, these polymers can be obtained in particular by free-radical polymerization and related processes, for example ATRP (=Atom Transfer Radical Polymerization), RAFT (=Reversible Addition Fragmentation Chain Transfer) or NMP processes (nitroxide-mediated polymerization). More preferably, the silane-containing polymers of the invention are prepared by free-radical polymerization.

Customary free-radical polymerization is described, inter alia, in Ullmann's Encyclopedia of Industrial Chemistry, Sixth Edition. In general, a polymerization initiator is used for this purpose. The usable initiators include the azo initiators widely known in the technical field, such as 2,2'-azo-bis-isobutyronitrile (AIBN), 2,2'-azo-bis-(2-methylbutyronitrile) (AMBN) and 1,1-azobiscyclohexanecarbonitrile, and also peroxy compounds such as methyl ethyl ketone peroxide, acetylacetone peroxide, dilauryl peroxide, tert-butyl peroxypivalate, tert-butyl peroxy-2-ethylhexanoate, tert-amyl peroxy-2-ethyl hexanoate, ketone peroxide, tert-butyl peroctoate, methyl isobutyl ketone peroxide, cyclohexanone peroxide, dibenzoyl peroxide, tert-butyl-peroxybenzoate, tert-butyl-peroxyisopropylcarbonate, 2,5-bis (2-ethylhexanoyhperoxy)-2,5-dimethylhexane, tert-butyl-peroxy-2-ethylhexanoate, tert-butyl-peroxy-3,5,5-trimethylhexanoate, dicumyl peroxide, 1,1-bis(tert-butyl-peroxy)cyclohexane, 1,1-bis(tert-butyl-peroxy)-3,3,5-trimethylcyclohexane, cumyl hydroperoxide, tert-butyl-hydroperoxide, bis(4-tert-butylcyclohexyl) peroxydicarbonate, mixtures of two or more of the aforementioned compounds with one another, and mixtures of the aforementioned compounds with compounds which have not been mentioned but can likewise form free radicals. Furthermore a chain transfer agents can be used.

It is well known in the art that a good way to control the molecular weight of a polymer chain is to use chain transfer agents during the polymerization synthesis. Chain transfer agents are molecules with a weak chemical bond which facilities the chain transfer reaction. During the chain transfer reaction, the radical of the polymer chain abstracts a hydrogen from the chain transfer agent, resulting in the formation of a new radical on the sulfur atom of the chain transfer agent capable of further propagation. Common chain transfer agents are organic compounds comprising SH groups such as n-butyl mercaptan, n-octyl mercaptan, dodecyl mercaptan, tert-dodecyl mercaptan, dodecylmercaptan, butylthiol glycolate, and octylthiol glycolate. Use of chain transfer agents leads to the polymer chain with one terminal end comprising the chain transfer agent. Therefore, it is possible to use chain transfer agent with functional groups so that one chain end comprises this group. According to a particular embodiment of the invention, the silane-containing polymer comprises a terminal polymer chain end derived from silane-containing chain transfer agent or is obtainable by a polymerization process using a silane-containing chain transfer agent. For example, 3-(Trimethoxysilyl)-1-propanethiol $HS(CH_2)_3Si(OCH_3)_3$, may be used as a chain transfer agent, and the resulting polymer will have a terminal chain end with $—S(CH_2)_3Si(OCH_3)_3$. Thus in a particular embodiment, the present invention relates to a silane-containing polymer as described above with all the characteristics and preferences indicated above applying to the polymer and having a terminal polymer chain end with $—S(CH_2)_3Si(OCH_3)_3$.

Especially, the monomer mixture to prepare the silane-containing polymer of the present invention may comprise 1 to 15% by weight, preferably 2 to 10% by weight and more preferable 4 to 8% by weight initiator based on the total weight of the monomer composition. The amount of chain transfer agents can be used in an amount of 0 to 2% by weight, preferably 0.01 to 1% by weight and more preferably 0.02 to 0.3% by weight based on the total weight of the monomer composition.

The polymerization may be carried out at standard pressure, reduced pressure or elevated pressure. The polymerization temperature is not critical. Conventionally the polymerization temperature may be in the range of 0° C. to 200° C., preferably 0° C. to 130° C., and more preferably 60° C. to 120° C. Higher temperatures are especially preferred in free radical polymerizations using high amounts of initiators.

The polymerization may be carried out with or without solvent. The term solvent is to be understood here in a broad sense.

The polymerization is preferably carried out in a nonpolar solvent. These include hydrocarbon solvents, for example aromatic solvents such as toluene, benzene and xylene, saturated hydrocarbons, for example cyclohexane, heptane, octane, nonane, decane, dodecane, which may also be present in branched form. These solvents may be used individually and as a mixture. Particularly preferred solvents are mineral oils, diesel fuels of mineral origin, naphthenic solvents, natural vegetable and animal oils, biodiesel fuels and synthetic oils (e.g. ester oils such as dinonyl adipate), and also mixtures thereof.

Base Oils

The lubricant compositions according to the invention can contain any types of lubricant base oils, mineral, synthetic or natural, animal or vegetable oils suited to their use. The base oils used in formulating the improved lubricating oil compositions of the present invention include, for example, conventional base stocks selected from API (American Petroleum Institute) base stock categories known as Group I, Group II, Group III, Group IV and Group V. The Group I and II base stocks are mineral oil materials (such as paraffinic and naphthenic oils) having a viscosity index (or VI) of less than 120. Group I is further differentiated from Group II in that the latter contains greater than 90% saturated materials and the former contains less than 90% saturated material (that is more than 10% unsaturated material). Group III is considered the highest level of mineral base oil with a VI of greater than or equal to 120 and a saturates level greater than or equal to 90%. Preferably the base oil included in the lubricating oil composition of the present invention is selected from the group consisting of API Group II and III base oils. Most preferably, the lubricant composition comprises an API Group III base oil. Group IV base oils are polyalphaolefins (PAO). Group V base oils are esters and any other base oils not included in Group I to IV base oils. These base oils can be used individually or as a mixture.

In an embodiment of the present invention and depending on the technical field in which the lubricant composition according to the present invention will be used, the base oil or mixture thereof represent at least 50% by weight, with respect to the total weight of the lubricant composition, preferably at least 60% by weight, more preferably at least 70% by weight, even more preferably 80% by weight. Typically, the lubricant composition according to the present invention comprises 75 to 99.9% by weight, more preferably 75 to 98% by weight, even more preferably 75 to 95% by weight of base oil or mixture thereof, based on the total weight of the lubricant composition.

Organic Solvents

Possible organic solvents include hydrocarbon solvents, for example aromatic solvents such as toluene, benzene and xylene, saturated hydrocarbons, for example cyclohexane, heptane, octane, nonane, decane, dodecane, which may also be present in branched form. These solvents may be used individually and as a mixture.

Additional Additives

The powders, concentrates or lubricant compositions according to the present invention may also comprise any type of additives suitable for use in the formulations. These additives include viscosity index improvers (like PAMA, OCP, PIB), pour point depressants, dispersants (like succinimides), demulsifiers, defoamers, anti-wear additives (like ZDDPs, Phosphates, Dithiophosphates, Dithiocabamates), extreme pressure additives (like sulphurized i-butenes, di-i-butens fatty acid esters, or thiadiazoles), lubricity additives, friction modifiers (like alkyldimethylphosphonates, glycerinmono-oleate, bis(2-hydroxyethyl)alkyllamines), phenolic or aminic antioxidants, detergents (like sulfonates, phenates), dyes, corrosion inhibitors (like succinic partial ester), yellow metal deactivator (like triazoles) and/or odourants.

Powder, Concentrate and Lubricating Composition Comprising the Polymeric-Inorganic Nanoparticles of the Invention and Uses Thereof The present invention also relates to a dry powder comprising the polymeric-inorganic nanoparticles of the present invention. In this special case, the silanization reaction step to prepare the polymeric-inorganic nanoparticles is conducted in an organic solvent. Preferred organic solvents are indicated above. The powder may also comprise further additives as indicated above, but a powder comprising 100% by weight of the polymeric-inorganic nanoparticles of the invention is preferred.

The present invention also relates to a concentrate comprising the polymeric-inorganic nanoparticles of the present invention. The concentrate corresponds to a blend in a base oil or an organic solvent of 10 to 90% by weight of the polymeric-inorganic nanoparticles of the present invention, based on the total weight of the concentrate. Preferred base oils and organic solvents are indicated above. The concentrate may also comprise further additives as indicated above. When the amounts of base oil and polymeric-inorganic nanoparticles do not sum up to 100% by weight of the total weight of the concentrate, then the remaining amount to sum up to 100% by weight of the total weight of the lubricating composition is made out of additional additives as described in the section above (item "additional additives").

The present invention also relates to a lubricating composition comprising at least one base oil and the polymeric-inorganic nanoparticles of the present invention. According to a preferred embodiment, the lubricating composition comprises from 50 to 99.99% by weight of at least one base oil and from 0.01 to 9.99% by weight of polymeric inorganic nanoparticles of the present invention, based on the total weight of the lubricant composition. When the amounts of base oil and polymeric-inorganic nanoparticles do not sum up to 100% by weight of the total weight of the lubricating composition, then the remaining amount to sum up to 100% by weight of the total weight of the lubricating composition is made out of additional additives as described in the section above (item "additional additives").

All of the characteristics and preferences indicated above for the base oil and the polymeric inorganic nanoparticles of the present invention apply to the above powder, concentrate or lubricating composition.

The lubricating composition may further comprise the additional additives indicated above.

The present invention further relates to the use of a polymeric inorganic nanoparticle as described herein for reducing wear and friction in a lubricant composition, and to the use of a lubricant composition comprising a polymeric inorganic nanoparticle as described herein as an automatic transmission fluid, a continuously variable transmission fluid, an engine oil, a gear oil, a hydraulic oil, or a grease.

The present invention relates to an automatic transmission fluid, a continuously variable transmission fluid, an engine oil, a gear oil, a hydraulic oil, or a grease comprising the polymeric-inorganic nanoparticles of the invention.

The invention also relates to an all-in-once lubricant additive which combines improved low temperature performance, as well as improved antiwear and ant-friction performances. This approach therefore avoids any incompatibilities between different package components, dispersing agents, and other additives in the lubricant formulation as a single additive combines all properties.

Indeed, in the experimental part below, it is demonstrated that a lubricating oil composition comprising polymeric-inorganic nanoparticles, wherein said inorganic nanoparticle are each covalently bonded to one or more polymers, each polymer comprising:

a). 0.1 to 50% by weight of units derived from one or more compounds of formula (I), based on the total weight of the monomer composition,

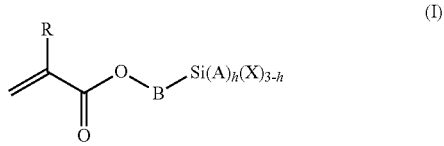

(I)

wherein R=H or CH$_3$
where 0≤h≤2
Si(A)$_h$(X)$_{3-h}$ is a silane functional group,
A is a branched or unbranched C1 to C4 alkyl residue,
B is a branched or unbranched, aliphatic, aromatic or mixed aliphatic-aromatic C1 to C30 carbon-based group,
X is selected from H, Cl or a group OY, wherein Y is H or a C1 to C30 branched or unbranched alkyl-, alkenyl-, aryl-, or aralkyl- group, branched or unbranched C2 to C30 alkylether-group or branched or unbranched C2 to C30 alkylpolyether-group or a mixture thereof, and
b1) 0 to 30% by weight of units derived from one or more alkyl (meth)acrylate monomers of formula (II), preferably 0 to 5% by weight, based on the total weight of the monomer composition,

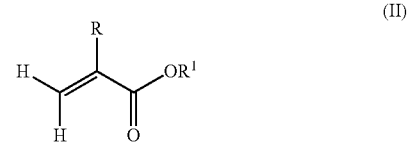

(II)

where R is hydrogen or methyl, R$^1$ means a linear, branched or cyclic alkyl residue with 1 to 8 carbon atoms,
band
b2) 0 to 99.9% by weight, more preferably 20 to 99.9% by weight, even more preferably 40 to 99.9% by weight, even more preferably 40 to 75% by weight of units derived from one or more alkyl (meth)acrylate monomers of formula (III)—based on the total weight of the monomer composition,

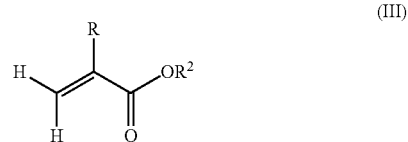

(III)

where R is hydrogen or methyl, R$^2$ means a linear, branched or cyclic alkyl residue with 9 to 15 carbon atoms, preferably with linear 12 to 15 carbon atoms, even more preferably with linear 12 to 14 carbon atoms,
and
b3) 0 to 99.9% by weight, preferably 0 to 80% by weight, more preferably 0 to 70% by weight, even more preferably 5 to 50% by weight, of units derived from one or more alkyl (meth)acrylate monomers of formula (IV), based on the total weight of the monomer composition,

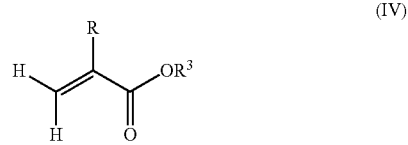

(IV)

where R is hydrogen or methyl, R$^3$ means a linear, branched or cyclic alkyl residue with 16 to 40 carbon atoms, preferably with linear 16 to 22 carbon atoms even more preferably linear 16 to 18 carbon atoms,
and wherein the at least one polymer comprises at least 50% by weight of either monomer units b2) or b3) or a mixture of both, based on the total weight of the monomer composition, and wherein the amounts of monomers a), b1), b2) and b3) are selected to sum up to 100% by weight of the mixture of monomer units a), b1), b2) and b3), not only has antiwear and anti-friction performances, but also has additionally improved low temperature performance.

All of the characteristics and preferences indicated above for the polymer, inorganic nanoparticles, base oils, solvents, processes and polymeric inorganic nanoparticles of the present invention apply to the powders, concentrates and lubricating compositions.

The invention also relates to the use of these polymeric-inorganic nanoparticles as described just above for reducing the pour point of a lubricant composition and to a pour point depressant comprising these polymeric-inorganic nanoparticles.

Method for Dispersing Inorganic Nanoparticles

The invention also relates to a method for dispersing inorganic nanoparticles in lubricating oil comprising bonding covalently the nanoparticles with one or more polymers, each polymer comprising:

a. units derived from one or more compounds of formula (I)

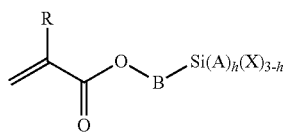

wherein R=H or CH$_3$
where 0≤h≤2

Si(A)$_h$(X)$_{3-h}$ is a silane functional group,

A is a branched or unbranched C1 to C4 alkyl residue,

B is a branched or unbranched, aliphatic, aromatic or mixed aliphatic-aromatic C1 to C30 carbon-based group, X is selected from H, Cl or a group OY, wherein Y is H or a C1 to C30 branched or unbranched alkyl-, alkenyl-, aryl-, or aralkyl- group, branched or unbranched C2 to C30 alkylether-group or branched or unbranched C2 to C30 alkylpolyether-group or a mixture thereof, and b. units derived from one or more alkyl (meth)acrylates, wherein the alkyl group comprises from 1 to 40 carbon atoms.

Surprisingly it has been observed that a higher quantity of inorganic nanoparticles could be dispersed in oil when using the chemically modified inorganic nanoparticles of the invention in comparison to non-modified inorganic nanoparticles.

In addition, the inventive polymeric-inorganic nanoparticles stay dispersed in oil and no aggregation of particles is observed.

Furthermore, advantageously, viscosity of a lubricating oil comprising the inventive polymeric-inorganic nanoparticles is only slightly affected, whereas viscosity of a lubricating oil comprising non-modified inorganic nanoparticles drastically increases because of the poor dispersancy and incompatibility with the oil.

All of the characteristics and preferences indicated above for the base oils, solvents, processes and polymeric inorganic nanoparticles of the present invention apply to the present method for dispersing nanoparticles.

Aspects of the present invention are as follows:

[1]. Polymeric-inorganic nanoparticle, wherein at least one polymer comprising:

a) units derived from one or more compounds of formula (I)

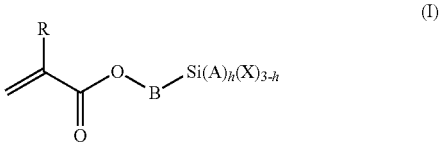

wherein R=H or CH$_3$
where 0≤h≤2

A is a branched or unbranched C1 to C4 alkyl residue,

B is a branched or unbranched, aliphatic, aromatic or mixed aliphatic-aromatic C1 to C30 carbon-based group, X is selected from H, Cl or a group OY, wherein Y is H or a C1 to C30 branched or unbranched alkyl-, alkenyl-, aryl-, or aralkyl- group, branched or unbranched C2 to C30 alkylether-group or branched or unbranched C2 to C30 alkylpolyether-group or a mixture thereof, and b). units derived from one or more alkyl (meth)acrylates, wherein the alkyl group comprises from 1 to 40 carbon atoms, is covalently bonded to an inorganic nanoparticle.

[2]. The polymeric-inorganic nanoparticle according to [1], wherein the compound of formula (I) is selected from 3-(Triethoxysilyl)propyl methacrylate, 3-(Trimethoxysilyl)propyl methacrylate, 3-(Trichlorosilyl)propyl methacrylate, even more preferably 3-(Trimethoxysilyl)propyl methacrylate.

[3]. The polymeric-inorganic nanoparticle according to [1] or [2], wherein each polymer consists of units a) and units b) as defined in claim 1.

[4]. The polymeric-inorganic nanoparticle according to [1] or [2], wherein the at least one polymer further comprises comonomer units, preferably units selected from the group consisting of 2-(Dimethylamino)ethyl methacrylate, Dimethylaminopropyl methacrylamide or mixture thereof.

[5]. The polymeric-inorganic nanoparticle according to [1], [2], [3] or [4], wherein the inorganic nanoparticle is selected from the group consisting of metal oxide nanoparticle, oxidized metal nitride nanoparticle, oxidized metal carbide nanoparticle, non-metal oxide nanoparticle or mixtures thereof.

[6]. The polymeric-inorganic nanoparticle according to [1], [2], [3], [4] or [5], wherein the inorganic nanoparticle is selected from SiO$_2$ or TiO$_2$.

[7]. The polymeric-inorganic nanoparticle according to [1], [2], [3], [4], [5] or [6], wherein the at least one polymer comprises units b) derived from one or more alkyl (meth)acrylates selected from (b1) units derived from one or more alkyl (meth)acrylate monomers of formula (II)

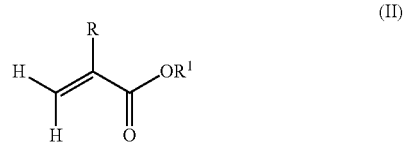

where R is hydrogen or methyl, $R^1$ means a linear, branched or cyclic alkyl residue with 1 to 6 carbon atoms, and/or (b2) units derived from one or more alkyl (meth)acrylate monomers of formula (III)

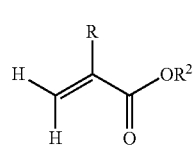
(III)

where R is hydrogen or methyl, $R^2$ means a linear, branched or cyclic alkyl residue with 7 to 15 carbon atoms, preferably with 12 to 15 carbon atoms, even more preferably with 12 to 14 carbon atoms, and/or (b3) units derived from one or more alkyl (meth)acrylate monomers of formula (IV)

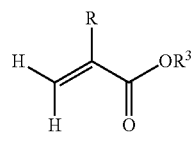
(IV)

where R is hydrogen or methyl, $R^3$ means a linear, branched or cyclic alkyl residue with 16-40 carbon atoms, preferably with 16 to 22 carbon atoms, even more preferably 16 to 18 carbon atoms.

[8]. The polymeric-inorganic nanoparticle according to [1], [2], [3], [4], [5], [6] or [7], wherein the at least one polymer comprises 0.1% by weight to 50% by weight, preferably 0.5% by weight to 40% by weight, more preferably 2% by weight to 35% by weight of units derived from monomer of Formula (I), based on the total weight of the monomer composition.

[9]. The polymeric-inorganic nanoparticle according to [1], [2], [3], [4], [5], [6], [7] or [8], wherein the at least one polymer comprises:

a) 0.1 to 50% by weight of units derived from one or more compounds of formula (I), based on the total weight of the monomer composition,

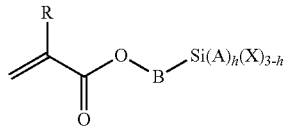
(I)

wherein R=H or $CH_3$
where $0 \leq h \leq 2$
A is a branched or unbranched C1 to C4 alkyl residue,
B is a branched or unbranched, aliphatic, aromatic or mixed aliphatic-aromatic C1 to C30 carbon-based group,
X is selected from H, Cl or a group OY, wherein Y is H or a C1 to C30 branched or unbranched alkyl-, alkenyl-, aryl-, or aralkyl- group, branched or unbranched C2 to C30 alkylether-group or branched or unbranched C2 to C30 alkylpolyether-group or a mixture thereof, and b1) 0 to 30% by weight of units derived from one or more alkyl (meth)acrylate monomers of formula (II), based on the total weight of the monomer composition,

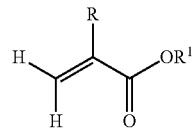
(II)

where R is hydrogen or methyl, $R^1$ means a linear, branched or cyclic alkyl residue with 1 to 6 carbon atoms, and b2) 0 to 75% by weight of units derived from one or more alkyl (meth)acrylate monomers of formula (III), based on the total weight of the monomer composition,

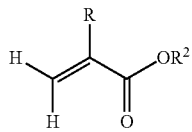
(III)

where R is hydrogen or methyl, $R^2$ means a linear, branched or cyclic alkyl residue with 7 to 15 carbon atoms, preferably with linear 12 to 15 carbon atoms, even more preferably with linear 12 to 14 carbon atoms, and b3) 0 to 75% by weight of units derived from one or more alkyl (meth)acrylate monomers of formula (IV), based on the total weight of the monomer composition,

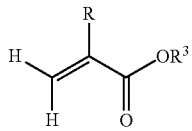
(IV)

where R is hydrogen or methyl, $R^3$ means a linear, branched or cyclic alkyl residue with 16 to 40 carbon atoms, preferably with linear 16 to 22 carbon atoms, even more preferably linear 16 to 18 carbon atoms, wherein the at least one polymer comprises at least 50% by weight of either monomer units b2) or b3) or a mixture of both, based on the total weight of the monomer composition, and wherein the amounts of monomers a), b1), b2) and b3) are selected to sum up to 100% by weight of the mixture of monomer units a), b1), b2) and b3).

[10]. The polymeric-inorganic nanoparticle according to [9], wherein the units derived from one or more alkyl (meth)acrylate monomers of Formula (II), (III) and (IV) comprise (b1) 0 to 5% by weight of units derived from one or more alkyl (meth)acrylate monomers of formula (II), based on the total weight of the monomer composition, (b2) 40 to 75% by weight of units derived from one or more alkyl (meth)acrylate monomers of formula (III), based on the total weight of the monomer composition, (b3) 5 to 50% by weight of units derived from one or more alkyl (meth)acrylate monomers of formula (IV), based on the total weight of the monomer composition.

[11]. The polymeric-inorganic nanoparticle according to [1], [2], [3], [4], [5], [6], [7], [8], [9] or [10], wherein the at least one polymer has a weight average molecular weight of 5,000 g/mol to 200,000 g/mol, more preferably of 5,000 g/mol to 120,000 g/mol.

[12]. Process for preparing the polymeric-inorganic nanoparticle as defined in [1], [2], [3], [4], [5], [6], [7], [8], [9], [10] or [11], wherein the process comprises:
 (i) preparing a polymer as defined in [1] to [11] by polymerizing a monomer composition comprising monomer a) of formula (I) and monomers b) derived from one or more C1-C40 alkyl (meth)acrylates,
 (ii) then covalently bonding the polymer of step (i) with inorganic nanoparticles.

[13]. The process of [12], wherein the reaction of the second step (ii) is conducted in a base oil or an organic solvent, preferably API Group I, Group II, Group III or Group IV base oils, toluene, heptane, or mixtures thereof.

[14]. The process of [12] or [13], wherein the second reaction step (ii) is performed by mixing at high speed greater than 4000 RPM, and optionally conducting an ultrasonic treatment.

[15]. The process of [12], [13] or [14], wherein the polymerization step (i) is performed using a reactive silane containing chain transfer agent, preferably 3-mercaptopropyltrimethoxysilane.

[16]. The polymeric-inorganic nanoparticle according to [1], [2], [3], [4], [5], [6], [7], [8], [9], [10] or [11], wherein the at least one polymer comprises a terminal polymer chain end derived from silane-containing chain transfer agent or is obtainable by a polymerization process according to [15].

[17]. Concentrate comprising polymeric-inorganic nanoparticles as defined in [1], [2], [3], [4], [5], [6], [7], [8], [9], [10] or [11] or [16], wherein the polymeric-inorganic nanoparticles are dispersed in base oil or an organic solvent.

[18]. Powder comprising polymeric-inorganic nanoparticles as defined in [1], [2], [3], [4], [5], [6], [7], [8], [9], [10] or [11] or [16].

[19]. Lubricating composition comprising a polymeric-inorganic nanoparticle as defined in any one of [1], [2], [3], [4], [5], [6], [7], [8], [9], [10] or [11] or [16].

[20]. The lubricating composition as in [19], wherein the lubricating composition comprises 50 to 99.9% by weight of at least one base oil and from 0.01 to 20% by weight of polymeric inorganic nanoparticles as [1], [2], [3], [4], [5], [6], [7], [8], [9], [10] or [11] or [16], based on the total weight of the lubricating composition.

[21]. Method of dispersing inorganic nanoparticles in lubricating oil comprising bonding covalently the nanoparticles with a polymer comprising:
 a. units derived from one or more compounds of formula (I)

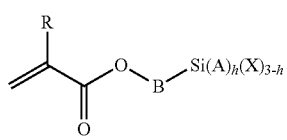

(I)

wherein R=H or CH$_3$
where 0≤h≤2
A is a branched or unbranched C1 to C4 alkyl residue,
B is a branched or unbranched, aliphatic, aromatic or mixed aliphatic-aromatic C1 to C30 carbon-based group,
X is selected from H, Cl or a group OY, wherein Y is H or a C1 to C30 branched or unbranched alkyl-, alkenyl-, aryl-, or aralkyl- group, branched or unbranched C2 to C30 alkylether-group or branched or unbranched C2 to C30 alkylpolyether-group or a mixture thereof,
and
 b. units derived from one or more alkyl (meth)acrylates, wherein the alkyl group comprises from 1 to 40 carbon atoms.

[22]. Use of the polymeric-inorganic particles as defined in [1], [2], [3], [4], [5], [6], [7], [8], [9], [10] or [11] or [16] in an oil lubricant formulation to reduce friction and/or to reduce wear.

[23]. Automatic transmission fluid, a continuously variable transmission fluid, an engine oil, a gear oil, a hydraulic oil, or a grease comprising polymeric-inorganic particles as defined in [1], [2], [3], [4], [5], [6], [7], [8], [9], [10] or [11] or [16].

[24]. Use of the polymeric-inorganic particles as defined in [9] or [10] to reduce the pour point of a lubricant composition.

[25]. Pour point depressant comprising the polymeric-inorganic particles as defined in [9] or [10].

The present invention is further illustrated by the following non-limiting examples.

EXPERIMENTAL PART

The invention is further illustrated in detail hereinafter with reference to examples and comparative examples, without any intention to limit the scope of the present invention.

Table 1 summarizes the monomer composition of each inventive and comparative examples:
 Polymers P1 to P7 and P12 and P13 will be used in the inventive examples
 Polymers P8 to P11 will be used in the comparative examples.

Preparation of Silane-Containing Copolymers According to the Invention (Polymers P1 to P7, P12 and P13)

The polymer weight average molecular weights were measured by gel permeation chromatography (GPC) calibrated using poly(methyl-methacrylate) standards. Tetrahydrofuran (THF) is used as eluent.

Example Polymer 1 (P1): Preparation of a Silane-Containing Copolymer According to the Invention 300 grams of 3-(Methacryloyloxy)propyl]trimethoxysilane, 700 grams of lauryl methacrylate (C12-C14 alkyl (meth)acrylate, and 39 grams of n-dodecyl mercaptan (n-DDM) were charged into 2 liter, 4-necked round bottom flask. The reaction mixture was stirred using a C-stirring rod, inerted with nitrogen, and heated to 110° C. Once the reaction mixture reached the setpoint temperature, t-butylperoctoate was fed into the reactor over 3 hours. 0.13 grams of t-butylperoctoate were fed in the first hour, 0.63 grams grams of t-butylperoctoate were fed in the second hour and 1.75 grams started of t-butylperoctoate were fed in the third hour. After the final initiator feed, the reaction was held at 110° C. for one hour. Residual monomer was measured by gas chromatography to ensure good monomer conversion. The polymer obtained has a weight average of 11800 g/mol (PMMA standard).

Polymer Examples 2-7, 12, 13 (P2-P7, P12, P13)

Eight additional polymers were prepared using the same preparation process as for Polymer 1 (P1). Variations were made in the weight percent of monomers charged and the weight percent and type of chain transfer agent charged according to Table 1 and Table 9.

Polymer P5 and Polymer P6 also include a methacrylate monomer with a tertiary amine functionality. This type of amine functionality is known to act as a dispersant because the heteroatom creates a polar region in the polymer which is able to attract small polar molecules (Rudnick, L. R. ed., 2009. *Lubricant additives: chemistry and applications*. CRC press. Pg. 331-332).

Instead of the chain transfer agent n-DDM, Polymer Example P7 uses the chain transfer agent 3-mercaptopropyltrimethoxysilane (MTMO) that has a reactive silane group attached to the thiol. Polymer Example P7 prepared with MTMO therefore has a reactive silane group on one terminal polymer chain end. Thus inventive Polymer Example P7 uses a combination of the reactive silane containing monomer of Formula (I) as defined in claim 1, as well as the chain transfer agent MTMO that contains a reactive silane group.

Preparation of Polymers for the Comparative Examples (Polymers P8 to P11)

Four additional polymers were prepared using the same preparation process as for Polymer 1 (P1). Variations were made in the weight percent of monomers charged and the weight percent and type of chain transfer agent charged according to Table 1.

Polymers P8 and P9 were synthesized following the same preparation procedure as in Example 1 but using the chain transfer agent MTMO and therefore have one silane group at the end of the polymer chain, the rest of the polymer chain being alkyl(meth)acrylate units. Thus the only possibility for the attachment of the polymer to the particle's surface is at the polymer chain end instead of at various points along the polymer chain according to the invention.

Comparative Polymer Example P10 was synthesized as a comparative example to demonstrate that a polyalkyl(meth)acrylate polymer with no reactive silane group cannot bond to the particles surface, and therefore cannot create a stable dispersion. This example contains C12 to C14 alkyl (meth) acrylate units.

Comparative Polymer Example P11 was also synthesized as a comparative example. This polymer does not contain any reactive silane group, but does contain a classic dispersant chemical structure, a tertiary amine.

The polymer compositions and the corresponding test results are summarized in Table 1.

TABLE 1

| | | Polymer composition | | | | | | | Comparative | | | |
|---|---|---|---|---|---|---|---|---|---|---|---|---|
| Polymer #: | | P1 | P2 | P3 | P4 | P5 | P6 | P7 | P8 | P9 | P10 | P11 |
| MEMO | [wt %] | 30 | 8 | 4 | 30 | 30 | 30 | 30 | | | | |
| C12-C14 MA | [wt %] | 70 | 92 | 96 | 44 | 67 | 67 | 70 | 100 | 100 | 100 | 97 |
| C16-C18 MA | [wt %] | | | | 26 | | | | | | | |
| % DMEAMA | [wt %] | | | | | 3 | | | | | | |
| % DMAPMA | [wt %] | | | | | | 3 | | | | | 3 |
| nDDM | [wt %] | 3.9 | 0.9 | 0.4 | 3.9 | 3.9 | 3.9 | | | | 3.9 | 3.9 |
| MTMO | relative to monomer total] | | | | | | | 3.0 | 1.5 | 3.0 | | |
| Mw | [kg/mol] | 11.8 | 64.1 | 108 | 14.8 | 35.8 | 20.0 | 14.4 | 28.0 | 14.4 | 14.5 | 35.8 |
| Mn | [kg/mol] | 6.4 | 24.4 | 43.9 | 7.3 | 9.4 | 9.6 | 8.5 | 15.1 | 8.5 | 8.5 | 9.3 |
| PDI | | 1.9 | 2.6 | 2.5 | 2.0 | 3.8 | 2.2 | 1.7 | 1.9 | 1.7 | 1.7 | 3.8 |

MA = alkyl(meth)acrylate
MEMO = 3-(Trimethoxysilyl)propyl methacrylate
DMAEMA = 2-(Dimethylamino)ethyl methacrylate
DMAPMA = Dimethylaminopropyl methacrylamide
DDM = dodecyl mercaptan
MTMO = 3-mercaptopropyltrimethoxysilane Preparation of Polymeric-Inorganic Nanoparticle Concentrates According to the Invention Example 1: Preparation of Polymeric-Inorganic Particle 181 grams of Nexbase 3043 and 9 grams of Aeroxide $TiO_2$ P90 (Commercial product from Evonik Industries: fumed titanium dioxide with average surface area (BET) of 90±20 $m^2/g$) were charged into a 500 mL 4 necked round bottom flask. The reaction mixture was stirred at 300 RPM using a C-stirring rod and heated to 90° C. A polymer solution was prepared separately by blending 1 gram of Polymer 1 and 9 grams of Nexbase 3043 using a magnetic stirring bar in a 50 mL beaker heated to 60° C. The polymer solution was fed into the reaction mixture in the round bottom flask over 2 hours. After the feed was completed, the reaction mixture was held for 2 hours at 90° C. with continued stirring. A final concentrate comprising 5 wt % of polymeric-inorganic $TiO_2$ particles was thus obtained.

Examples 2-16 and 36-43: Preparation of Additional Polymeric-Inorganic Particles Additional examples were prepared in the same way as Example 1 except that the weight ratio of components was changed according to Table 2 below. The polymer solution feed was always adjusted so that the amount of polymer in the solution was equal to 10 weight percent. A final concentrate comprising 5 wt % of polymeric-inorganic nanoparticles was thus obtained.

Aeroxide P25 is a commercial product from Evonik Industries and is a fumed titanium dioxide with average surface area (BET) of 50±15 $m^2/g$.

Aerosil 150 is a commercial product from Evonik Industries and is a fumed silica with average surface area (BET) of 150±15 $m^2/g$.

Aerosil 200 is a commercial product from Evonik Industries and is a fumed silica with average surface area (BET) of 200±25 $m^2/g$.

Aeroxide T805 is a commercial product from Evonik Industries and is a fumed titanium dioxide with average surface area (BET) of 35-55 $m^2/g$ that is highly hydrophobized with organosilane molecules.

Visual Appearance

A stability test was conducted for each sample by diluting a small amount of concentrate to 1 wt % solution of the polymeric inorganic nanoparticle, i.e weight % of particle and polymer, with the Nexbase 3043 base oil. The dilution was prepared by blending one concentrate chosen from Examples 1 to 16 or Comparative Examples 1 to 4 in a 50 mL glass bleaker at room temperature for one hour. For example, 10 grams of Example were mixed with 40 grams of Nexbase 3043 to obtain a 1 wt % solution of polymeric-inorganic particles.

Comparative examples 5 to 9 are simple mixtures of inorganic nanoparticles not chemically modified with a base oil. For comparative examples 5 to 8, the stability test was performed on the oil blend as described in Table 3.

Additionally, 5 ppm of Solvaperm Blue 2B from Clariant (organic dye) was added to SiO2 inorganic nanoparticle blends to visually enhance the separation since both layers are transparent.

Each dilution was placed in 15 mL glass vial and allowed to stay at room temperature. The vials were checked after blending, after 24 hours, and weekly thereafter for signs of sedimentation. The stability of the dispersion and amount of sedimentation were classified into 4 categories: o: no sedimentation (no particles settled at the bottom of the vial); A: minor sedimentation (some particles start to settle at the bottom of the vial); +: moderate sedimentation (thin layer at the bottom of the vial), and +++: nearly complete sedimentation (almost all particles have settled and supernatant is almost clear).

The results obtained as shown in Tables 2 and 3 below.

TABLE 2

Inventive examples

| | | Ex. 1 | Ex. 2 | Ex. 3 | Ex. 4 | Ex. 5 | Ex. 6 | Ex. 7 | Ex. 8 | Ex. 9 | Ex 10 | Ex 11 | Ex 12 | Ex 13 | Ex 14 | Ex 15 | Ex 16 |
|---|---|---|---|---|---|---|---|---|---|---|---|---|---|---|---|---|---|
| Aeroxide P90 | [wt %] | 4.50 | 4.00 | 3.50 | 3.25 | | | | | | | | | | | | |
| Aeroxide P25 | [wt %] | | | | | 4.50 | 4.00 | 4.00 | 4.00 | 4.00 | 4.00 | 4.00 | 4.00 | | | | |
| Aerosil 150 | [wt %] | | | | | | | | | | | | | 4.50 | 4.00 | | |
| Aerosil 200 | [wt %] | | | | | | | | | | | | | | | 4.50 | 4.00 |
| Polymer P1 | [wt %] | 0.5 | 1.00 | 1.50 | 1.75 | 0.50 | 1.00 | | | | | | | 0.50 | 1.00 | 0.50 | 1.00 |
| Polymer P2 | [wt %] | | | | | | | 1.00 | | | | | | | | | |
| Polymer P3 | [wt %] | | | | | | | | 1.00 | | | | | | | | |
| Polymer P4 | [wt %] | | | | | | | | | 1.00 | | | | | | | |
| Polymer P5 | [wt %] | | | | | | | | | | 1.00 | | | | | | |
| Polymer P6 | [wt %] | | | | | | | | | | | 1.00 | | | | | |
| Polymer P7 | [wt %] | | | | | | | | | | | | 1.00 | | | | |
| Nexbase 3043 | [wt %] | 95 | 95 | 95 | 95 | 95 | 95 | 95 | 95 | 95 | 95 | 95 | 95 | 95 | 95 | 95 | 95 |
| Weight ratio particle:polymer | | 1:0.11 | 1:0.25 | 1:0.43 | 1:0.54 | 1:0.11 | 1:0.25 | 1:0.25 | 1:0.25 | 1:0.25 | 1:0.25 | 1:0.25 | 1:0.25 | 1:0.11 | 1:0.25 | 1:0.11 | 1:0.25 |
| Concentration polymeric-inorganic nanoparticle | [wt %] | 5 | 5 | 5 | 5 | 5 | 5 | 5 | 5 | 5 | 5 | 5 | 5 | 5 | 5 | 5 | 5 |
| Stability after 24 hours | | Δ | o | o | o | o | o | o | o | o | o | o | o | o | o | o | o |
| Stability after 1 week | | Δ | Δ | o | o | Δ | o | Δ | Δ | o | o | o | Δ | o | o | o | o |

TABLE 2-continued

Inventive examples

| | Inventive Example # | | | | | | | | | | | | | | | |
|---|---|---|---|---|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex 10 | Ex 11 | Ex 12 | Ex 13 | Ex 14 | Ex 15 | Ex 16 |
| Stability after 3 weeks | Δ | Δ | Δ | Δ | Δ | Δ | Δ | Δ | Δ | Δ | Δ | Δ | o | o | o | o |
| Stability after 6 weeks | Δ | Δ | Δ | Δ | Δ | Δ | Δ | Δ | Δ | Δ | Δ | Δ | o | o | o | o | o: no sedimentation (no particles settles at the bottom of the vial)
Δ: minor sedimentation (some particles start to settle at the bottom of the vial)
+: moderate sedimentation (thin layer at the bottom of the vial)
+++: nearly complete sedimentation (almost all particles have settled and supernatant is almost clear)

TABLE 3

Comparative examples

| | | Polymeric inorganic particle of state of the art | | Blends of polymer and inorganic particle | | Inorganic particle | | | | |
|---|---|---|---|---|---|---|---|---|---|---|
| Comparative Example # | | Comp 1 | Comp 2 | Comp 3 | Comp 4 | Comp 5 | Comp 6 | Comp 7 | Comp 8 | Comp 9 |
| Aeroxide P25 | [wt %] | 4.0 | 4.0 | 4.0 | 4.0 | 0.9 | | | | |
| Aeroxide P90 | [wt %] | | | | | | 0.9 | | | |
| Aerosil 150 | [wt %] | | | | | | | 0.9 | | |
| Aerosil 200 | [wt %] | | | | | | | | 0.9 | |
| Aeroxide T805 | [wt %] | | | | | | | | | 0.9 |
| Polymer P8 | [wt %] | 1.0 | | | | | | | | |
| Polymer P9 | [wt %] | | 1.0 | | | | | | | |
| Polymer P10 | [wt %] | | | 1.0 | | | | | | |
| Polymer P11 | [wt %] | | | | 1.0 | | | | | |
| Nexbase 3043 | [wt %] | 95 | 95 | 95 | 95 | 99.1 | 99.1 | 99.1 | 99.1 | 99.1 |
| Weight ratio particle:polymer | | 1:0.25 | 1:0.25 | 1:0.25 | 1:0.25 | | not applicable | | | |
| concentration polymer inorganic nanoparticle | [wt %] | 5 | 5 | 5 | 5 | | not applicable | | | |
| Stability after 24 hours | | Δ | Δ | + | + | +++ | +++ | + | + | + |
| Stability after 1 week | | + | + | +++ | +++ | +++ | +++ | +++ | +++ | +++ |
| Stability after 3 weeks | | + | + | +++ | +++ | +++ | +++ | +++ | +++ | +++ |
| Stability after 6 weeks | | + | + | +++ | +++ | +++ | +++ | +++ | +++ | +++ | o: no sedimentation (no particles settles at the bottom of the vial)
Δ: minor sedimentation (some particles start to settle at the bottom of the vial)
+: moderate sedimentation (thin layer at the bottom of the vial)
+++: nearly complete sedimentation (almost all particles have settled and supernatant is almost clear)

Tables 2 and 3 show the stability over time of lubricating compositions comprising the polymeric-inorganic nanoparticles of the present invention in comparison to lubricating compositions of the art. In particular, the results in Table 2 show little to no deposit at the bottom of the lubricant bottles for lubricants comprising the polymeric-inorganic nanoparticles, whereas a heavy sedimentation is observed for lubricants comprising the standard inorganic nanoparticles.

Sedimentation is the tendency for particles in suspension to settle out of the fluid in which they are entrained and come to rest against a barrier. Adverse effects resulting from the settlement of particles are usually handled by the use of dispersing agent. However, this treatment often reduces the amount of particles to be added as a side effect and only delays the settlement effect and does not avoid particle agglomeration over time. As it can be seen from the results in Table 2, lubricating composition prepared with no dispersing agent and comprising the inventive polymeric-inorganic nanoparticles of the invention have outstanding dispersancy properties over a long period of time and little to no sedimentation of the particles in oils is observed.

Figure 5:
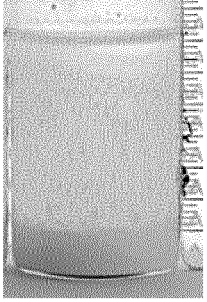
FIG. 5 contains pictures illustrating the level of sedimentation of a lubricating composition comprising polymeric-inorganic particles according to the invention compared to a lubricating composition comprising unmodified inorganic particles.
Figure 5:
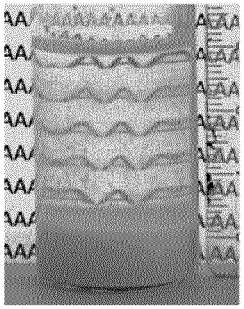
Figure 5:
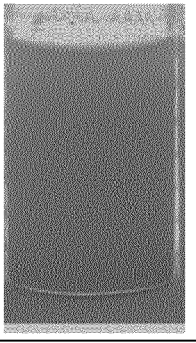
Figure 5:
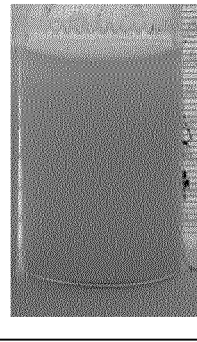

FIG. 5 shows pictures comparing:
the lubricating composition prepared according to Example 6 comprising the polymeric-inorganic nanoparticles of the present invention, and
the lubricating composition of Comparative Example 5.
After 24 hours, a heavy sedimentation is observed for the lubricant of Comparative Example 5. In addition, the sediment comprises particle agglomerates that can be easily seen. In contrast, the lubricant of inventive Example 6 has a milky appearance and no agglomerate can be observed.

Preparation of Polymeric-Inorganic Nanoparticle Concentrates Using Ultrasonic Treatment and High Speed Mixing Example 17: Preparation of Polymeric-Inorganic TiO₂ Particles Using Ultrasonic Treatment and High Speed Mixing 5 g of AEROXIDE® TiO$_2$ P 90 were added into a solution of 94 g Nexbase 3043 oil and 1 gram of Polymer 1 using a Ultra-Turrax. The dispersion was intensely processed for 30 minutes at 7000 RPM at room temperature. Afterwards, the dispersion was treated by ultrasound for 60 minutes using an ultrasound processor UP400S with 400 Watt, 24 kHz with Ti-sonotrode.

Examples 18-25: Preparation of Further Polymeric-Inorganic Using Ultrasonic Treatment and High Speed Mixing Examples 18 to 25 were prepared in the same way as Example 17 except that the weight ratios of components were changed according to Table 4.

Example 26: Preparation of Polymeric-Inorganic Oxidized hBN Particles Using Ultrasonic Treatment and High Speed Mixing Hexagonal Boron Nitride (hBN) is a commercial product with average surface area (BET) of 10 $m^2/g$. The particle size D50 of the nano hBN is less than 100 nm.

In order to increase the number of available hydroxyl groups on the surface of the hBN particles, a preoxidation step was conducted, in which the hBN nanoparticles were placed in an 800° C. oven for 24 hours. Infrared spectroscopy confirmed that there was an increase in OH content in the particle.

10 g of oxidized hBN were added into a solution of 85 g Nexbase 3043 oil and 5 grams of Polymer P1 using a high speed mixer. The dispersion was intensely processed for 30 minutes at 7000 RPM at room temperature. The dispersion was also treated by ultrasound for 60 minutes using an ultrasound processor UP400S with 400 Watt, 24 kHz with Ti-sonotrode. A final concentrate comprising 15 wt % of polymeric-inorganic nanoparticles in base oil was obtained.

Example 27: Preparation of Another Polymeric-Inorganic hBN Using Ultrasonic Treatment and High Speed Mixing Example 27 was prepared in the same way as Example 26 except that the weight ratios of components were changed according to Table 4.

ultrasonic treatment. In particular, the results in Table 4 show little to no deposit at the bottom of the lubricant bottles for lubricants comprising these polymeric-inorganic nanoparticles.

Example 19 of Table 4 can be compared to Example 2 of Table 2. Both polymeric-inorganic nanoparticles according to the invention are prepared with Aeroxide P90 and Polymer P1. Example 19 shows excellent stability over time and no sedimentation, while Example 2 prepared without using an ultrasonic treatment has very slight sedimentation after one week which does not increase, meaning that the dispersion of Example 2 is stable and the sediment corresponds to large particle aggregate which would have needed ultrasonic treatment.

Additional Stability Tests on Concentrated Solutions (Concentrates)

The particle size distribution was measured in Nexbase 3043 oil using the dynamic light scattering equipment LB-500 produced by Horiba Ltd.

Dynamic light scattering (DLS) is a technique in physics that can be used to determine the size distribution profile of small particles in suspension or polymers in solution. This equipment can be used to measure the particle size of dispersed material (inorganic nanoparticles or polymeric spheres, e.g.) in the range from 3 nm to 6 µm. The measurement is based on the Brownian motion of the particles within the medium and the scattering of incident laser light because of a difference in refraction index of liquid and solid material.

The resulting value is the hydrodynamic diameter of the particle's corresponding sphere. The values d50, d90 and d99 are common standards for discussion, as these describe the hydrodynamic diameter of the particle below which 50%, 90% or 99% of the particles are within the particle size distribution. The lower these values, the better the particle dispersion. Monitoring these values can give a clue about the particle dispersion stability. If the values increase tremendously, the particles are not stabilized enough and may tend to agglomerate and sediment over time resulting in a lack of stability. Depending on the viscosity of the medium, it can

TABLE 4

| Inventive Example # | | Ex. 17 | Ex. 18 | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|---|---|---|
| Aeroxide P90 | [wt %] | 5 | 10 | 10 | 10 | 20 | | | | | | |
| Aerosil 200 | [wt %] | | | | | | 4 | 4 | | | | |
| Aeroxide Alu C | | | | | | | | | 10 | 30 | | |
| Oxidized hBN | | | | | | | | | | | 10 | 5 |
| Polymer P1 | [wt %] | 1 | 1 | 2 | 3 | 6 | 0.4 | 0.8 | 3 | 9 | 5 | 1.5 |
| Nexbase 3043 | [wt %] | 94 | 89 | 88 | 87 | 74 | 95.6 | 95.2 | 87 | 61 | 85 | 93.5 |
| Weight ratio particle:polymer | | 1:0.2 | 1:0.1 | 1:0.2 | 1:0.3 | 1:0.3 | 1:0.1 | 1:0.2 | 1:0.3 | 1:0.3 | 1:0.5 | 1:0.3 |
| Concentration polymeric-inorganic nanoparticle | [wt %] | 6 | 11 | 12 | 13 | 26 | 4.4 | 4.8 | 13 | 39 | 15 | 6.5 |
| Stability after 24 hours | | ○ | ○ | ○ | ○ | ○ | ○ | ○ | ○ | ○ | ○ | ○ |
| Stability after 1 week | | ○ | ○ | ○ | ○ | ○ | ○ | ○ | ○ | ○ | ○ | ○ |
| Stability after 3 weeks | | ○ | ○ | ○ | ○ | ○ | ○ | ○ | ○ | ○ | Δ | Δ |
| Stability after 6 weeks | | ○ | ○ | ○ | ○ | ○ | ○ | ○ | ○ | ○ | Δ | Δ |

○: no sedimentation (no particles settles at the bottom of the vial)
Δ: minor sedimentation (some particles start to settle at the bottom of the vial)
+: moderate sedimentation (thin layer at the bottom of the vial)
+++: nearly complete sedimentation (almost all particles have settled and supernatant is almost clear)

Table 4 shows the stability over time of lubricating compositions comprising the polymeric-inorganic nanoparticles of the present invention prepared using high speed and be stated, that a d99 value of <500 nm (e.g. for Nexbase base oil) is an indication for a stable dispersion as the particles are held in abeyance over time.

Example 19, Example 20, and Example 21 of Table 4 were submitted to another stability test where the concentrated examples were placed in an oven that shifts the temperature between 5° C. and 50° C. (a change in temperature is performed every 12 hours). The samples were temporarily removed at the time intervals shown in Table 5 to measure particle size distribution using the DLS method previously described.

TABLE 5

| | | Example # | | |
|---|---|---|---|---|
| | | 19 | 20 | 21 |
| d50 values: | | | | |
| after preparation | [nm] | 104 | 90 | 91 |
| 1 day | [nm] | 100 | 81 | 89 |
| 1 week | [nm] | 105 | 88 | 96 |
| 2 weeks | [nm] | 102 | 95 | 95 |
| 4 weeks | [nm] | 105 | 94 | 93 |
| 9 weeks | [nm] | 108 | 90 | 95 |
| d90 values: | | | | |
| after preparation | [nm] | 113 | 98 | 99 |
| 1 day | [nm] | 112 | 91 | 98 |
| 1 week | [nm] | 114 | 97 | 109 |
| 2 weeks | [nm] | 113 | 108 | 110 |
| 4 weeks | [nm] | 113 | 103 | 99 |
| 9 weeks | [nm] | 124 | 98 | 109 |
| d99 values: | | | | |
| after preparation | [nm] | 126 | 110 | 110 |
| 1 day | [nm] | 115 | 99 | 108 |
| 1 week | [nm] | 119 | 100 | 114 |
| 2 weeks | [nm] | 127 | 114 | 113 |
| 4 weeks | [nm] | 126 | 113 | 111 |
| 9 weeks | [nm] | 130 | 107 | 114 |

The results of Table 5 further demonstrate the excellent stability of the lubricating compositions according to the invention and show that very little agglomeration occurs in these dispersions over a long period of time. The particle size value do not increase significantly.

Within the time frame of 9 weeks the d50, d90 and d99 values slightly increase, but are so low that they can be still considered to correspond to a stable dispersion. Indeed, the values remain below the aforementioned 500 nm, and taking into account the accuracy of the measurement method (approximately 10 relative %) the d99 values of the examples in Table 5 are close to the initial measured values after one day As a comparison, it may be mentioned that a dispersion using AEROXIDE® $TiO_2$ P 90 in Nexbase 3043 base oil (2 wt % particles) results in DLS values of 747, 848 and 874 nm (d50, d90, d99, respectively).

Dispersion Efficiency and Handling Capabilities of the Polymeric-Inorganic Nanoparticles 25 g of the concentrate of Example 21 (as disclosed in Table 4) was placed in a glass jar to illustrate the effectiveness of the dispersancy of the polymeric-inorganic nanoparticles of the invention. The calculated amount of $TiO_2$ raw material that is contained in this amount of solution is 5 g. The mixture comprising the polymeric-inorganic nanoparticles of the invention is milky and no particles or aggregates can be seen in the solution or settled at the bottom of the jar. The viscosity of the oil observed at room temperature is only slightly influenced (see FIG. 4—flask on the left hand side).

Figure 4:
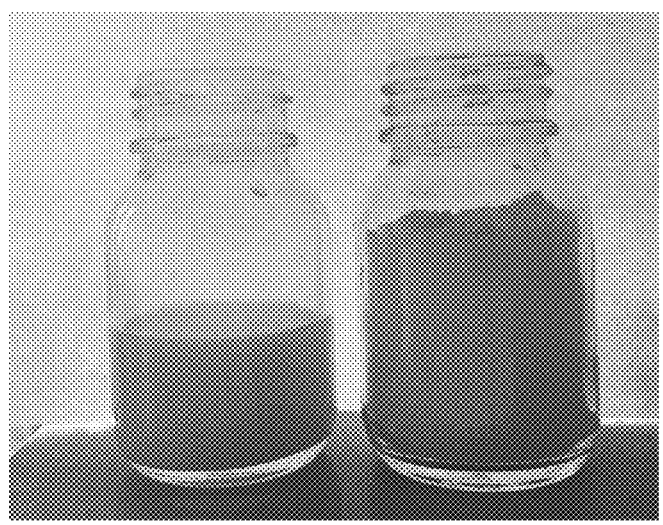
FIG. 4 is a picture of a concentrated solution of polymeric-inorganic $TiO_2$ nanoparticles according to the invention compared to a dry powder of unmodified $TiO_2$ nanoparticles, both having equal amount of particles.

In another jar, 5 grams of P90 $TiO_2$ powder were placed to exemplify to volume of $TiO_2$ contained in the polymeric inorganic nanoparticle dispersion (see FIG. 4—flask on the right hand side). When attempting to blend oil into the jar, the oil and powder do no mix well, cause a thickening of the solution, very large aggregates are seen, and sedimentation starts to occur immediately, thus showing that it is not possible to disperse these 5 grams of P90 $TiO_2$ powder in such a flask.

This test shows how the polymeric-inorganic nanoparticles of the invention amazingly well dispersed, allowing to add a higher quantity of nanoparticles, even in a smaller volume of base oil. This is a very strong advantage for industrial applications for volume savings and handling capabilities (e.g. no mask, easier to pour).

Preparation of Polymeric Inorganic Particles in Solvent—Example 28

Example 6 was repeated except that the organic solvent toluene was used instead of the base oil Nexbase 3043.

172 grams of toluene and 8 grams of Aeroxide P25 were charged into a 500 mL 4 necked, round bottom flask. The reaction mixture was stirred at 300 RPM using a C-stirring rod and heated to 90° C. A polymer solution was prepared separately by blending 2 grams of Polymer 1 and 18 grams of Nexbase 3043 using a magnetic stirring bar in a 50 mL beaker heated to 60° C. The polymer solution was fed into the reaction mixture in the round bottom flask over 2 hours. After the feed was completed, the reaction mixture was held for 3 hours at 90° C. with continued stirring. Toluene was removed via rotary evaporation at 100° C. and less than 15 mm Hg pressure. A final dry powder comprising 100% by weight of the polymeric-inorganic nanoparticles of the invention was obtained that may later be dispersed (Example 28).

The same stability test was repeated wherein the 0.5 g of the dry powder of Example 28 were dispersed in 49.5 g of Nexbase 3043. The same good stability results were obtained as in Example 6, wherein the same polymeric inorganic nanoparticle was prepared in Nexbase 3043, instead of a solvent as described in Example 28.

Determination of Wear and Friction Properties of the Lubricating Composition According to the Invention Lubricating formulations were prepared according to weight ratios shown in Table 7 below and their friction and wear performances were tested using three methods described below.

Determination of the Reduction in Wear According to Four Ball Wear Test

Four ball wear tests were performed according to DIN 51350—Part 5 at an applied force of 300 N. The setup used was as described in DIN 51350—Part 1. After the tests, wear scar was measured by digital camera and average results were calculated.

Table 8 summarizes the results of the 4 ball wear test.

The reference base oil, Nexbase 3043, generates an average wear scar of 0.929 mm.

Comparative Example 5 represents a formulation with unmodified Aeroxide P25 $TiO_2$ nanoparticles, and provide a slight decrease in the wear scar diameter compared to the reference oil.

Comparative example 9 is a simple blend of Polymer P1 in the reference oil (no particle). This polymer provides a decrease in wear compared to the blank oil.

Example 28 contains the polymeric inorganic particles synthesized using Polymer P1 and Aeroxide P25. The particles are well dispersed and stable in the formulation. The measured wear scar diameter is decreased by 36% compared to the base oil reference.

Determination of the Reduction in Friction Via Mini Traction Machine

The coefficient of friction was measured using a Mini traction machine named MTM2 from PCS Instruments following two different test methods. The test conditions are described in Table 6 below. SRR refers to the Sliding Roll Ratio. This parameter was maintained constant during the 2 hours test and is defined as $(U_{Ball}-U_{Disc})/U$ wherein $(U_{Ball}-U_{Disc})$ represents the sliding speed and U the entrainment speed, given by $U=(U_{Ball}+U_{Disc})/2$.

TABLE 6

Protocols to measure the decrease in friction

|  | Method 1 | Method 2 |
|---|---|---|
| Test Rig | MTM 2 from PCS Instruments | |
| Disc | Highly polished stainless Steel AISI 52100 Disc diameter 46 mm | |
| Ball | Highly polished stainless Steel AISI 52100 Ball diameter 19.05 mm | |
| Frequency/Length |  | 0.5 Hz/4 mm |
| Speed | 5-2500 mm/s | |
| Temperature | 100° C. | 100° C. |
| Load | 30N | 47N |
| SRR | 50% | 200% |

According to MTM Method 1, the friction coefficient was recorded over the complete range of speed for each blend and a Stribeck curve is obtained. The friction tests were performed according to these conditions for the formulations listed in Table 7 and results thereof are disclosed in Table 8 below.

According to MTM Method 2, the mini traction machine, MTM2 from PCS Instruments was used with another protocol described as described in Table 6 above to further demonstrate the friction and wear benefits of the polymeric inorganic nanoparticles according to the present invention. With this method, friction coefficient was measured over time with a reciprocating system. The ball was blocked and pure sliding conditions were applied. At the end of the test, a wear mark over 4 mm long on the disc and a wear mark on the ball were obtained and measured. The friction coefficient at the end of the test was reported.

Figure 1:
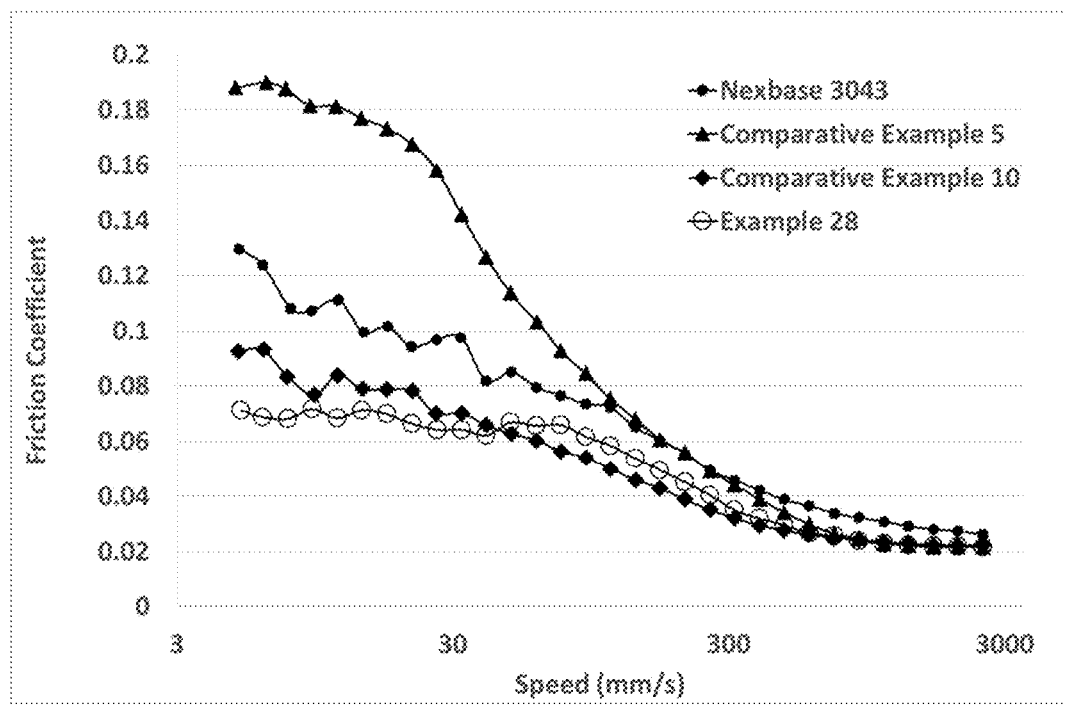
FIG. 1 is a graph showing the coefficient of friction of different lubricating compositions plotted as a function of mean speed (average speed between ball speed and disc speed).
Figure 2:
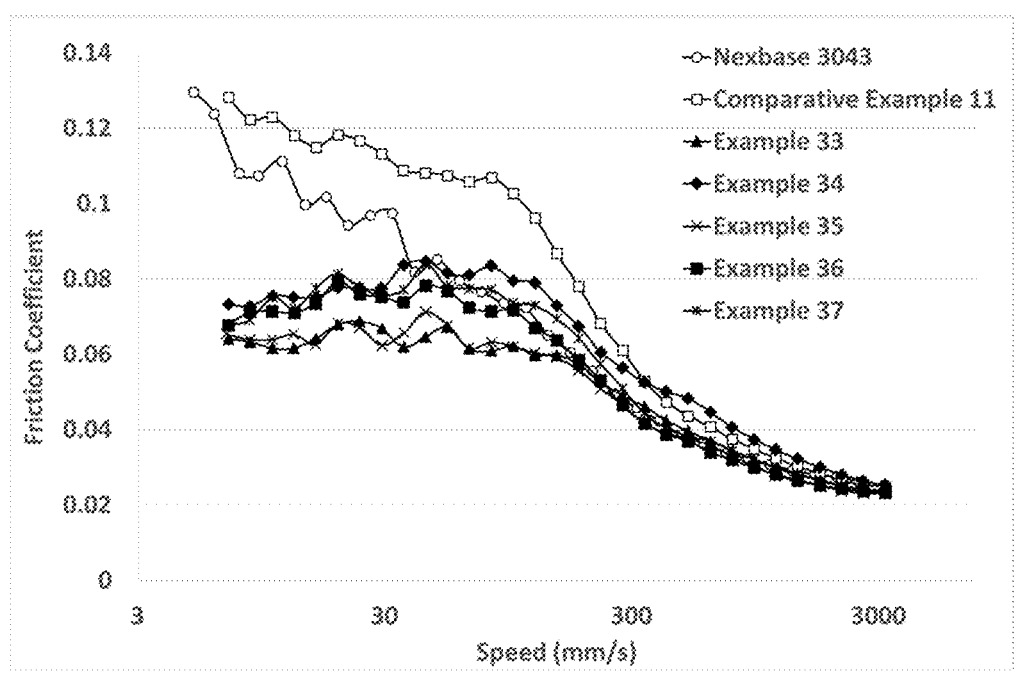
FIG. 2 is a graph showing the coefficient of friction of different lubricating compositions plotted as a function of mean speed (average speed between ball speed and disc speed).

FIGS. 1 and 2 show the Stribeck curves for each sample, i.e the friction coefficient plotted as a function of speed.

To express in % the friction reduction, a quantifiable result can be expressed as a number and is obtained by integration of the friction value curves in the range of sliding speed 5 mm/s-35 mm/s using the trapezoidal rule. The area corresponds to the "total friction" over the selected speed regime. The smaller the area, the greater the friction-reducing effect of the product examined. The percentage friction reductions were calculated by using the values of the reference oil. Accordingly, negative and positive values indicate an increase and decrease of friction coefficients, respectively. Values in relation to the reference oil are compiled in the table below.

TABLE 7

| | | Lubricant Example # | | | | | | | | | | | | | |
|---|---|---|---|---|---|---|---|---|---|---|---|---|---|---|---|
| | | Nexbase 3043 | Comp 5 | Comp 10 | Comp 11 | Ex. 28 | Ex. 29 | Ex. 30 | Ex. 31 | Ex. 32 | Ex. 33 | Ex. 34 | Ex. 35 | Ex. 36 | Ex. 36 |
| Comp 2 | [wt %] | | | | 22.5 | | | | | | | | | | |
| Comp 5 | [wt %] | | 100 | | | | | | | | | | | | |
| Polymer P1 | [wt %] | | | 0.1 | | | | | | | | | | | |
| Example 5 | [wt %] | | | | | | 20 | | | | | | | | |
| Example 6 | [wt %] | | | | | | | | | | 22.5 | | | | |
| Example 9 | [wt %] | | | | | | | | | | | 22.5 | | | |
| Example 10 | [wt %] | | | | | | | | | | | | | 22.5 | |
| Example 11 | [wt %] | | | | | | | | | | | | 22.5 | | |
| Example 12 | [wt %] | | | | | | | | | | | | | | 22.5 |
| Example 19 | [wt %] | | | | | | | | 10 | 1 | | | | | |
| Example 20 | [wt %] | | | | | | | | | | 10 | 1 | | | |
| Nexbase 3043 | [wt %] | 100 | 0 | 99.9 | 77.5 | 77.5 | 90 | 99 | 90 | 99 | 77.5 | 77.5 | 77.5 | 77.5 | 77.5 |
| % of each component in the lubricant composition | | | | | | | | | | | | | | | |
| Aeroxide P25 | [wt %] | 0.9 | | 0.9* | 0.9* | | | | | | | 0.9* | 0.9* | 0.9* | 0.9* | 0.9* |
| Aeroxide P90 | [wt %] | | | | | 1.0* | 0.1* | 1* | 0.1* | | | | | | |
| Polymer P1 | [wt %] | | | 0.1 | | 0.1* | 0.2* | 0.02* | 0.03* | 0.03* | 0.225* | | | | |

TABLE 7-continued

| | | Lubricant Example # | | | | | | | | | | | | | |
|---|---|---|---|---|---|---|---|---|---|---|---|---|---|---|---|
| | | Nexbase 3043 | Comp 5 | Comp 10 | Comp 11 | Ex. 28 | Ex. 29 | Ex. 30 | Ex. 31 | Ex. 32 | Ex. 33 | Ex. 34 | Ex. 35 | Ex. 36 | Ex. 36 |
| Polymer P4 | [wt %] | | | | | | | | | | | 0.225* | | | |
| Polymer P5 | [wt %] | | | | | | | | | | | | 0.225* | | |
| Polymer P6 | [wt %] | | | | | | | | | | | | | 0.225* | |
| Polymer P7 | [wt %] | | | | | | | | | | | | | | 0.225* |
| Polymer P9 | [wt %] | | | 0.225* | | | | | | | | | | | |
| Nexbase 3043 | [wt %] | 100 | 100 | 99.1 | 99.1 | 98.875 | 99 | 98.8 | 98.88 | 98.7 | 99.87 | 98.875 | 98.875 | 98.875 | 98.875 | 98.875 |

*Covalently bonded

TABLE 8

| | | Example # | | | | | | | | | | | | | |
|---|---|---|---|---|---|---|---|---|---|---|---|---|---|---|---|
| | | NB3043 | Comp 5 | Comp 10 | Comp 11 | Ex. 28 | Ex. 29 | Ex. 30 | Ex. 31 | Ex. 32 | Ex. 33 | Ex. 34 | Ex. 35 | Ex. 36 | Ex. 36 |
| 4-ball wear test | wear scar diameter [mm] | 0.929 | 0.78 | 0.676 | | 0.59 | | | | | | | | | |
| | % reduction | reference | 16.0 | 27.2 | | 36.5 | | | | | | | | | |
| MTM Method 1 | Friction area from 5-35 mm/s | 3.44 | 5.63 | 2.62 | 4.22 | 2.3 | | | | | 2.4 | 2.91 | 2.44 | 2.77 | 2.85 |
| | % reduction | reference | −63.7 | 23.8 | −22.7 | 33.1 | | | | | 30.2 | 15.4 | 29.1 | 19.5 | 17.2 |
| MTM Method 2 | Friction coefficient at 7200 sec | 0.148 | | 0.143 | | | 0.128 | 0.124 | 0.128 | 0.123 | | | | | |
| | % reduction | reference | | 3.4 | | | 13.5 | 16.2 | 13.5 | 16.9 | | | | | |
| | ball wear scar diameter [mm] | 0.501 | | 0.492 | | | 0.381 | 0.464 | 0.344 | 0.441 | | | | | |
| | % reduction | reference | | 1.8 | | | 24.0 | 7.4 | 31.3 | 12.0 | | | | | |
| | disc wear scar diameter [mm] | 0.472 | | 0.439 | | | 0.349 | 0.435 | 0.337 | 0.416 | | | | | |
| | % reduction | reference | | 7.0 | | | 26.1 | 7.8 | 28.6 | 11.9 | | | | | |

As shown in the Stribeck curves of FIG. 1 and results of Table 8, the results of the calculated total friction in the range of sliding speed 5 mm/s-35 mm/s clearly show that the inventive example 28 has a much better effect with regard to the reduction in friction than the corresponding comparative examples and reference Nexbase 3043 oil. Nexbase 3043 is the reference base oil and generates an area of friction of 3.44 mm/s. Comparative Example 5 represents a formulation with unstable TiO₂ particles, and this unstable dispersion significantly increases the friction area. Comparative example 10 contains the Polymer P1 used to synthesize the polymeric inorganic particle decreases friction area compared to the base oil. In contrast, Example 28, which contains the inventive polymeric-inorganic nanoparticle of the invention obviously shows the best effect and decreases area friction by 33% compared to the reference.

It was observed that the unstable particles are difficult to measure, and settle during testing procedure. The increase in friction generated in MTM Method 1 compared to the reference oil further demonstrates this effect. An expert in the art knows that an unstable particle would not allow the nanoparticles to perform their desired effect and thus further unstable dispersions were not tested.

FIG. 2 shows the Stribeck curves for inventive Examples 33 to 36, base oil reference and Comparative Example 11. Here again it can be observed a decrease in friction for sliding speed 5 mm/s-35 mm/s for the lubricating composition comprising the inventive polymeric-inorganic nanoparticles. Comparative Example 11 is made with modified nanoparticles of the state of the art, wherein the polymer does not contain any silane group along the polymer chain and is attached to the particle through one single reactive silane group at the end of the polymer chain. The lubricating composition of Comparative Example 11 show an increase in friction compared to the base oil similar to that of the unstable dispersion of nanoparticles of Comparative Example 5 (see FIGS. 1 and 2). The best decreases in friction are obtained with the polymeric-inorganic nanoparticles of the invention.

The results of MTM method 2 further demonstrate the improved performance of the polymeric inorganic nanoparticles. The final friction coefficient values for all inventive Examples 29 to 32 show a decrease in friction compared to the reference base oil or a formulation containing only Polymer P1. Examples 30 and 32 only contain 0.1 wt % of the polymeric inorganic particle and still decrease the friction.

Figure 3:
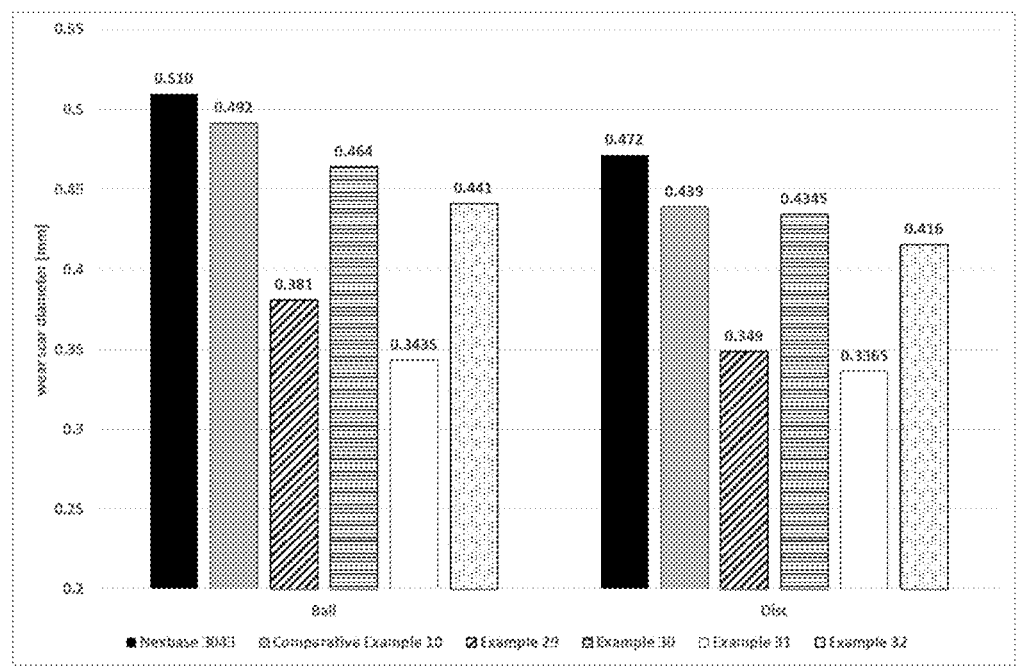
FIG. 3 is a bar chart showing the average wear scar diameters of lubricating compositions comprising polymeric-inorganic particles according to the invention.

An additional wear scar test was run (see Table 8—MTM Method 2). The wear scar was measured on the ball and the disc after the MTM Method 2 was completed. Again, the polymeric inorganic particles decrease the wear scar on both the ball and the disc compared to the polymer P1 formulation and the reference base oil (see FIG. 3).

The results obtained were not foreseeable from the available documentation of the state of the art. The polymeric-inorganic nanoparticles according to the present invention provide anti-wear and anti-friction properties to the lubricant oil compositions, in which they are mixed. It has been demonstrated that the chemically modified nanoparticles of the invention have a positive influence on friction and wear behaviors, while maintaining excellent stability over a long period of time in the lubricating oil.

Determination of the Pour Point Properties of the Lubricating Composition According to the Invention The pour point of a fluid is a measurement of the temperature at which the sample becomes semi-solid and loses its flow characteristics. According to ASTM D97 and ASTM D5949, the pour point is measured in either 1° or 3° interval. The "no flow point" is measured in a similar way, but the temperature is the recorded at 0.1° intervals thus providing better resolution. The No Flow Point for the examples provided were measured in ° C. according to ASTM D7346 using the instrument MPP 5Gs manufactured by PAC.

As aforementioned, it has been observed that some specific polymeric-inorganic nanoparticles according to the invention do not only show antiwear and antifriction performance, but are also able to reduce the pour point of a lubricating composition. These polymeric-inorganic nanoparticles are prepared using a polymer having alkyl(meth) acrylate units with 7 to 15 carbon atoms, preferably linear 12 to 14 carbon atoms, alkyl(meth)acrylate units with 16 to 40 carbon atoms, preferably linear 16 to 18 carbon atoms, or mixture of both in addition to the silane-containing monomer of Formula (I), and optionally any other alkyl(meth) acrylate monomers or comonomers as described above.

Table 9 shows some silane-containing polymer compositions useful to prepare polymeric-inorganic nanoparticles having pour point depressant effect as well as antiwear and antifriction properties.

TABLE 9

| | | Polymer #: | | | |
|---|---|---|---|---|---|
| | | P1 | P4 | P12 | P13 |
| MEMO | [wt %] | 30 | 30 | 8 | 30 |
| C12-C14 MA | [wt %] | 70 | 44 | 66 | |
| C16-C18 MA | [wt %] | | 26 | 26 | 70 |
| nDDM | [wt % relative to monomer total] | 3.9 | 3.9 | 0.9 | 3.9 |
| Mw | [kg/mol] | 11.8 | 14.8 | 61.4 | 16.3 |
| Mn | [kg/mol] | 6.4 | 7.3 | 25.5 | 7.92 |
| PDI | | 1.9 | 2 | 2.4 | 2.1 |

Using these silane-containing polymers of Table 9, some polymeric-inorganic nanoparticles were prepared according to the compositions shown in Table 10 below.

TABLE 10

| Example # | | Ex. 6 | Ex. 37 | Ex. 38 | Ex. 9 | Ex. 39 | Ex. 40 | Ex. 41 | Ex. 42 | Ex. 43 |
|---|---|---|---|---|---|---|---|---|---|---|
| Aeroxide P25 | [wt %] | 4 | 4 | | 4 | | | | | 4 |
| Aeroxide P90 | [wt %] | | | 4 | | 4 | 4 | | | |
| Aerosil 150 | [wt %] | | | | | | | 4 | 4 | |
| Polymer P1 | [wt %] | 1 | | | | | | | | |
| Polymer P4 | [wt %] | | | | 1 | 1 | | | 1 | |
| Polymer P12 | [wt %] | | | | | | 1 | 1 | | 1 |
| Polymer P13 | [wt %] | | | | | | | | | |
| Nexbase 3043 | [wt %] | 95 | 95 | 95 | 95 | 95 | 95 | 95 | 95 | 95 |
| Weight ratio particle:polymer | | 1:0.25 | 1:0.25 | 1:0.25 | 1:0.25 | 1:0.25 | 1:0.25 | 1:0.25 | 1:0.25 | 1:0.25 |
| concentration polymeric-inorganic nanoparticle | [wt %] | 5 | 5 | 5 | 5 | 5 | 5 | 5 | 5 | 5 |

Some lubricating compositions were prepared according to the recipes of Table 11 and using the polymeric-inorganic nanoparticles of Table 10.

Example 6 corresponding to a concentrate of polymeric-inorganic nanoparticles according to the invention was diluted to prepare lubricating compositions, so that the amount of polymeric-inorganic particles in each lubricating composition was equal to the 1%, 1.5%, 2%, and 3% by weight (4 different dilutions). The no flow point was measured.

In addition, the individual components that are used to synthesize the polymeric-inorganic nanoparticles contained in the concentrate of Example 6 were also diluted to prepare lubricating compositions:

Polymer P1 was blended into the Nexbase 3043 base oil at 0.1 wt %, 0.2 wt %, 0.3%, and 0.5 wt % (also 4 different dilutions)

Aeroxide P25 particles were also temporarily dispersed in the base oil at 0.8 wt %, 1.2 wt %, and 1.6 wt % using 60 min of ultrasonication (3 different dilutions).

TABLE 11

| Example # | | NB3043 | Comparative examples | | | | | | | Examples | | | |
|---|---|---|---|---|---|---|---|---|---|---|---|---|---|
| | | | 12 | 13 | 14 | 15 | 16 | 17 | 18 | 43 | 44 | 45 | 46 |
| Polymer P1 | [wt %] | | 0.1 | 0.2 | 0.3 | 0.5 | | | | | | | |
| Aroxide P25 | [wt %] | | | | | | 0.8 | 1.2 | 1.6 | | | | |
| Example 6 | [wt %] | | | | | | | | | 20 | 30 | 40 | 60 |
| Nexbase 3043 | [wt %] | 100 | 99.9 | 99.8 | 99.7 | 99.5 | 99 | 98.8 | 98.4 | 80 | 70 | 60 | 40 |
| | | | % of each component in the lubricant composition | | | | | | | | | | |
| Aeroxide P25 | [wt %] | | | | | | 0.8 | 1.2 | 1.6 | 0.8* | 1.2* | 1.6* | 2.4* |
| Polymer P1 | [wt %] | | 0.1 | 0.2 | 0.3 | 0.5 | | | | 0.2* | 0.3* | 0.4* | 0.6* |
| Nexbase 3043 | [wt %] | 100 | 99.9 | 99.8 | 99.7 | 99.5 | 99.2 | 98.8 | 98.4 | 99 | 98.5 | 98 | 97 |
| No Flow Point | [° C.] | −17.8 | −16.1 | −16.8 | −17.4 | −18.6 | −19 | −18.5 | −20 | −25.3 | −26.9 | −28.4 | −32.4 |

*covalently bonded

As shown in Table 11, the polymers which do not contain linear alkyl chains of C16 or greater have almost no influence on the no flow point of the oil (see Comparative examples 12 to 15 versus reference base oil). In fact, it worsens the no flow point at certain treat rates (see Comparative examples 12 to 14). The particles also had very little influence on the no flow point of the oil (see Comparative examples 16 to 18).

Surprisingly, the polymeric inorganic particle outperforms both individual components (polymer alone or particle alone) providing a significant decrease of the no flow point of the oil reaching a no flow point of −32.4° C. This result is even more surprising that the polymer P1 does not any contain linear alkyl chain of C16 or greater. It is known in the art that poly(alkyl)methacrylate-type PPDs needs to have monomer units derived from alkyl(meth)acrylate having 16 to 30 carbon atoms to show good pour point depressant properties. In contrast, in the present invention, it has been surprisingly found that these polymeric inorganic particles provide improvement in pour point, even when there is little to no alkyl(meth)acrylate units having 16 to 30 carbon atoms used.

As shown in Table 12 below, additional polymeric-inorganic particles were prepared using Polymer P13 (high fraction of linear C16 to C18 alkyl(meth)acrylate monomer to prepare the polymer without including any C12 to C14 alkyl(meth)acrylate monomer—see Table 9) and different inorganic nanoparticles.

TABLE 12

| Example # | | NB3043 | Comparative Examples | | | | Examples | |
|---|---|---|---|---|---|---|---|---|
| | | | 17 | 19 | 20 | 21 | 47 | 48 |
| Aeroxide P25 | [wt %] | | 1.2 | | | | | |
| Aeroxide P90 | [wt %] | | | 1.2 | | | | |
| Aerosil 150 | [wt %] | | | | 1.2 | | | |
| Polymer P13 | [wt %] | | | | | 0.3 | | |
| Example 37 | [wt %] | | | | | | 30 | |
| Example 38 | [wt %] | | | | | | | 30 |
| Nexbase 3043 | [wt %] | 100 | 98.8 | 98.8 | 98.8 | 99.7 | 70 | 70 |
| | | | % of each component in the lubricant composition | | | | | |
| Aeroxide P25 | [wt %] | | 1.2 | | | | 1.2* | |
| Aeroxide P90 | [wt %] | | | 1.2 | | | | 1.2* |
| Aerosil 150 | [wt %] | | | | 1.2 | | | |
| Polymer P13 | [wt %] | | | | | 0.3 | 0.3* | 0.3* |
| Nexbase 3043 | [wt %] | 100 | 98.8 | 98.8 | 98.8 | 99.7 | 98.5 | 98.5 |
| No Flow Point | [° C.] | −17.8 | −18.5 | −18.9 | −18 | −18.1 | −23.3 | −22 |

*covalently bonded

Again, the polymeric inorganic particle outperforms both components providing a significant decrease the last flow point of the oil (see Examples 47 and 48 versus Comparative Examples 17, 19 to 20 of Table 12).

Polymer P4 and Polymer P12 were used to synthesize additional polymeric-inorganic nanoparticles as shown in Table 13 below.

TABLE 13

| Example # | | Ex. 49 | Ex. 50 | Ex. 51 | Ex. 52 | Ex. 53 | Ex. 54 | Ex. 55 | Ex. 56 |
|---|---|---|---|---|---|---|---|---|---|
| Example 9 | [wt %] | 30 | | | | | | 20 | 40 |
| Example 39 | [wt %] | | 30 | | | | | | |
| Example 40 | [wt %] | | | 30 | | | | | |
| Example 43 | [wt %] | | | | 30 | | | | |
| Example 41 | [wt %] | | | | | 30 | | | |

TABLE 13-continued

| Example # | | Ex. 49 | Ex. 50 | Ex. 51 | Ex. 52 | Ex. 53 | Ex. 54 | Ex. 55 | Ex. 56 |
|---|---|---|---|---|---|---|---|---|---|
| Example 42 | [wt %] | | | | | | 30 | | |
| Nexbase 3043 | [wt %] | 70 | 70 | 70 | 70 | 70 | 70 | 80 | 80 |
| % of each component in the lubricant composition (*covalently bonded) | | | | | | | | | |
| Aeroxide P25 | [wt %] | 1.2* | | | 1.2* | | | 0.8* | 1.6* |
| Aeroxide P90 | [wt %] | | 1.2* | 1.2* | | | | | |
| Aerosil 150 | [wt %] | | | | | 1.2* | 1.2* | | |
| Polymer P4 | [wt %] | 0.3* | 0.3* | | | | 0.3* | 0.2* | 0.4* |
| Polymer P12 | [wt %] | | | 0.3* | 0.3* | 0.3* | | | |
| Nexbase 3043 | [wt %] | 98.5 | 98.5 | 98.5 | 98.5 | 98.5 | 98.5 | 99 | 98 |
| No Flow Point | [° C.] | −40 | −32.4 | −34.6 | −40 | −40.8 | −38.9 | −38.8 | −40.2 |

Examples 49-56 of Table 13 also show outstanding pour point effect.

Figure 6:
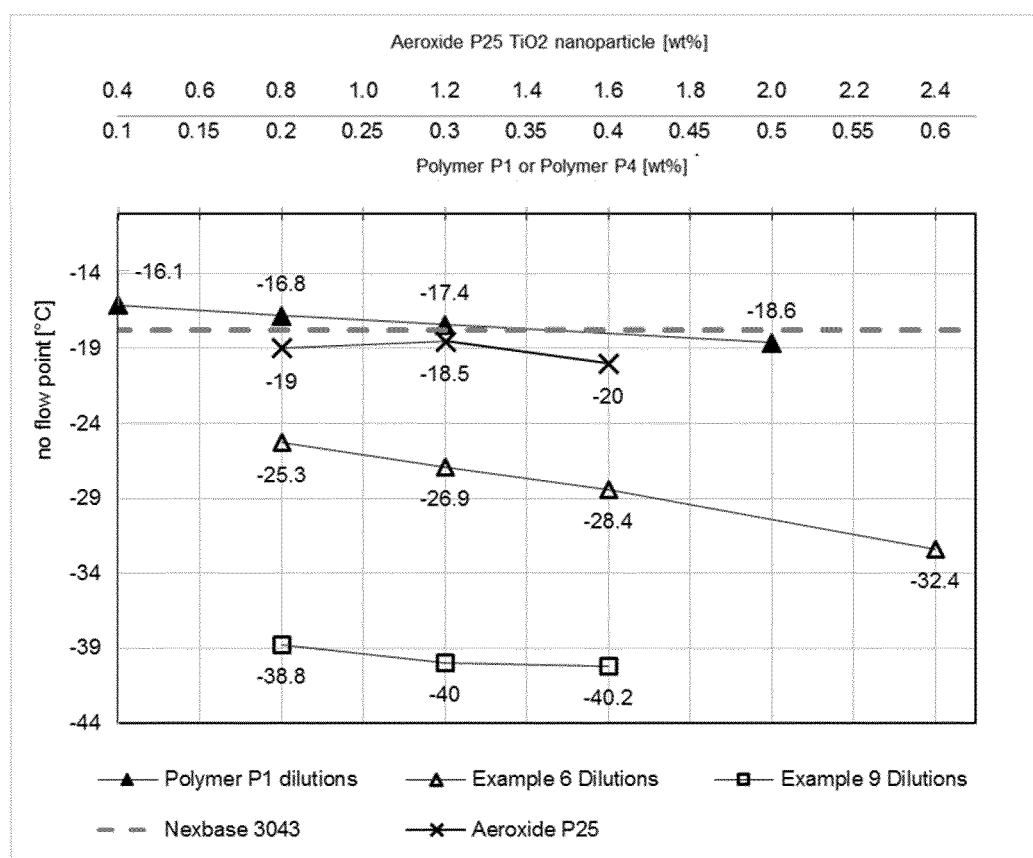
FIG. 6 is a graph showing the no flow point of different lubricating compositions plotted as a function of the weight percentages of the additive.

FIG. 6 shows the no flow point of lubricating compositions made out of Polymer P1 (Comparative Examples 12 to 15 of Table 11), lubricating compositions comprising Aeroxide P25 nanoparticles (Comparative Examples 16 to 18 of Table 11), the base oil reference (Table 11) and lubricating compositions prepared using the polymeric-inorganic nanoparticle concentrates of Inventive Example 6 (corresponding lubricating compositions of Comparative Examples 43 to 46 of Table 11) and inventive Example 9 (corresponding lubricating compositions of Comparative Examples 49, 55, 56 of Table 13).

List of Abbreviations And Definitions

Aeroxide P90 is a commercial product from Evonik Industries and is a fumed titanium dioxide with average surface area (BET) of 90±20 m²/g.

Aeroxide P25 is a commercial product from Evonik Industries and is a fumed titanium dioxide with average surface area (BET) of 50±15 m²/g.

Aerosil 150 is a commercial product from Evonik Industries and is a fumed silica with average surface area (BET) of 150±15 m²/g.

Aerosil 200 is a commercial product from Evonik Industries and is a fumed silica with average surface area (BET) of 200±25 m²/g.

Aeroxide T805 is a commercial product from Evonik Industries and is a fumed titanium dioxide with average surface area (BET) of 35-55 m²/g that is highly hydrophobized with organosilane molecules.

Aeroxide Alu C is a commercial product from Evonik Industries and is a fumed aluminum oxide with average surface area (BET) of 100±15 m²/g.

Nexbase 3043 (NB3043) is a commercial product from Neste and is a colorless, catalytically hydroisomerized and dewaxed API Group III base oil comprising hydrogenated, highly isoparaffinic hydrocarbons.

Solvaperm Blue 2B from Clariant is an blue organic dye
MEMO=3-(Trimethoxysilyl)propyl methacrylate
DMAEMA=2-(Dimethylamino)ethyl methacrylate
DMAPMA=Dimethylaminopropyl methacrylamide
DDM=dodecyl mercaptan
MTMO=3-mercaptopropyltrimethoxysilane The abbreviation "C12-C14 MA" corresponds to a mixture of alkylmethacrylate containing approximately 73 wt % linear C12 methacrylate, 27 wt % linear C14 methacrylate.

The abbreviation "C16-C18 MA" corresponds to a mixture of alkylmethacrylate containing approximately 1 wt % linear C12 methacrylate, 5 wt % linear C14 methacrylate, 30 wt % linear C16 methacrylate, 63 wt % linear C18 methacrylate, and 1 wt % C20 methacrylate.

The invention claimed is:

1. A polymeric-inorganic nanoparticle, comprising one inorganic nanoparticle covalently bonded to one or more polymers, each polymer comprising:
   a) units derived from at least one compound of formula (I):

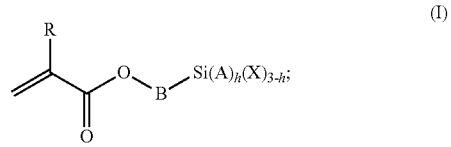

and
   b) units derived from at least one alkyl (meth)acrylate, wherein the alkyl group of the alkyl (meth)acrylate comprises from 1 to 40 carbon atoms,
   wherein:
   at least two units a) of each polymer are covalently bonded to the inorganic nanoparticle;
   R is H or CH$_3$;
   Si(A)$_h$(X)$_{3-h}$ is a silane functional group, where 0≤h≤2;
   A is a branched or unbranched C1 to C4 alkyl residue;
   B is a branched or unbranched, aliphatic, aromatic or mixed aliphatic-aromatic C1 to C30 carbon-based group;
   X is selected from H, Cl or a group OY, wherein Y is H or a C to C30 branched or unbranched alkyl-, alkenyl-, aryl-, or aralkyl- group, branched or unbranched C2 to C30 alkylether-group or branched or unbranched C2 to C30 alkylpolyether-group or a mixture thereof; and
   the units b) derived from the at least one alkyl (meth) acrylate are selected from the group consisting of:
   (b1) 0 to 30% by weight of units derived from at least one alkyl (meth)acrylate monomer of formula (II), based on the total weight of the monomer composition:

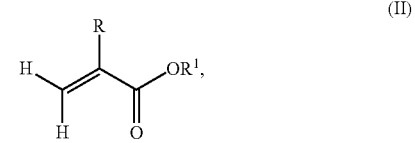

where R is hydrogen or methyl, and R$^1$ is a linear, branched or cyclic alkyl residue with 1 to 8 carbon atoms,
   (b2) 0 to 99.9% by weight of units derived from at least one alkyl (meth)acrylate monomer of formula based on the total weight of the monomer composition:

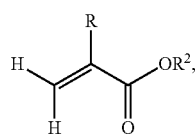

(III)

where R is hydrogen or methyl, and $R^2$ is a linear, branched or cyclic alkyl residue with 9 to 15 carbon atoms, and (b3) 0 to 99.9% by weight of units derived from at least one alkyl (meth)acrylate monomer of formula (IV), based on the total weight of the monomer composition:

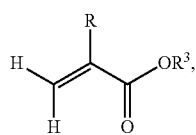

(IV)

where R is hydrogen or methyl, and $R^3$ is a linear, branched or cyclic alkyl residue with 16 to 40 carbon atoms, wherein:

each polymer comprises at least 10% by weight of either monomer units b2) or b3) or a mixture of both, based on the total weight of the monomer composition; and the amounts of monomers a), b1), b2) and b3) are selected to sum up to 100% by weight of the mixture of monomers a), b1), b2) and b3).

2. The polymeric-inorganic nanoparticle according to claim 1, wherein the compound of formula (I) is selected from the group consisting of 3-(triethoxysilyl)propyl methacrylate, 3-(trimethoxysilyl)propyl methacrylate, and 3-(trichlorosilyl)propyl methacrylate.

3. The polymeric-inorganic nanoparticle according to claim 1, wherein each polymer consists of the units a) and the units b).

4. The polymeric-inorganic nanoparticle according to claim 1, wherein the at least one polymer further comprises comonomer units.

5. The polymeric-inorganic nanoparticle according to claim 1, wherein the inorganic nanoparticle is selected from the group consisting of a metal oxide nanoparticle, an oxidized metal nitride nanoparticle, an oxidized metal carbide nanoparticle, a non-metal oxide nanoparticle, and mixtures thereof.

6. The polymeric-inorganic nanoparticle according to claim 1, wherein the inorganic nanoparticle is selected from the group consisting of $SiO_2$ and $TiO_2$.

7. The polymeric-inorganic nanoparticle according to claim 1, wherein each polymer comprises 0.1% by weight to 50% by weight of the units a), based on the total weight of the monomer composition.

8. The polymeric-inorganic nanoparticle according to claim 1, wherein each polymer comprises:

a) 0.1 to 50% by weight of the units a) derived from one or more compounds of formula (I), based on the total weight of the monomer composition;

b2) 0 to 99.9% by weight of units derived from at least one alkyl (meth)acrylate monomer of formula (III), based on the total weight of the monomer composition:

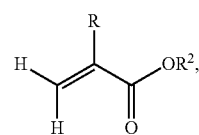

(III)

where R is hydrogen or methyl, and $R^2$ is a linear, branched or cyclic alkyl residue with 9 to 15 carbon atoms; and b3) 0 to 99.9% by weight of units derived from at least one alkyl (meth)acrylate monomer of formula (IV), based on the total weight of the monomer composition:

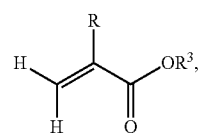

(IV)

where R is hydrogen or methyl, and $R^3$ is a linear, branched or cyclic alkyl residue with 16 to 40 carbon atoms, wherein:

the at least one polymer comprises at least 10% by weight of either monomer units b2) or b3) or a mixture of both, based on the total weight of the monomer composition; and the amounts of monomers a), b2) and b3) are selected to sum up to 100% by weight of the mixture of monomer units a), b2) and b3).

9. The polymeric-inorganic nanoparticle according to claim 1, wherein each polymer comprises at least 50% by weight of either monomer units b2) or b3) or a mixture of both, based on the total weight of the monomer composition.

10. The polymeric-inorganic nanoparticle according to claim 9, wherein the units derived from one or more alkyl (meth)acrylate monomers of Formula (II), (III) and (IV) comprise:

(b1) 0 to 5% by weight of units derived from at least one alkyl (meth)acrylate monomer of formula (II), based on the total weight of the monomer composition;

(b2) 40 to 75% by weight of units derived from at least one alkyl (meth)acrylate monomer of formula (III), based on the total weight of the monomer composition; and (b3) 5 to 50% by weight of units derived from at least one alkyl (meth)acrylate monomer of formula (IV), based on the total weight of the monomer composition.

11. The polymeric-inorganic nanoparticle according to claim 1, wherein each polymer comprises a terminal polymer chain end derived from silane-containing chain transfer agent.

12. The polymeric-inorganic nanoparticle according to claim 1, wherein each polymer has a weight average molecular weight of 5 000 g/mol to 200 000 g/mol.

13. The polymeric-inorganic nanoparticle according to claim 1, wherein a weight ratio between the nanoparticle and the one or more polymers covalently bonded to the inorganic nanoparticle is from 1:0.02 to 1:1.

14. A process for preparing the polymeric-inorganic nanoparticle of claim 1, the process comprising:

(i) polymerizing a monomer composition comprising the at least one compound a) of formula (I) and the at least one alkyl (meth)acrylate b), to obtain the polymer; and (ii) covalently bonding the polymer with the inorganic nanoparticles.

15. The process of claim 14, wherein the covalently bonding step (ii) is conducted in a base oil or an organic solvent.

16. The process of claim 14, wherein the covalently bonding step (ii) occurs with mixing at high speed greater than 4000 RPM, and optionally with an ultrasonic treatment.

17. The process of claim 14, wherein the polymerizing step (i) occurs in the presence of a reactive silane containing chain transfer agent.

18. A concentrate, comprising the polymeric-inorganic nanoparticles of claim 1, wherein 10 to 90% by weight of the polymeric-inorganic nanoparticles are dispersed in a base oil or an organic solvent, based on a total weight of the concentrate.

19. A powder, comprising the polymeric-inorganic nanoparticles of claim 1.

20. A lubricating composition, comprising the polymeric-inorganic nanoparticles of claim 1.

21. The lubricating composition as claimed in claim 20, comprising 50 to 99.99% by weight of at least one base oil, based on a total weight of the lubricating composition.

22. A method for producing the polymeric-inorganic nanoparticle of claim 1, the method comprising covalently bonding the inorganic nanoparticles dispersed in a lubricating oil with the one or more polymers.

23. An oil lubricant formulation for reducing friction and/or wear, wherein the oil lubricating formulation comprises the polymeric-inorganic nanoparticle of claim 1.

24. A composition, comprising the polymeric-inorganic particle of claim 1, wherein the composition is selected from the group consisting of a continuously variable transmission fluid, an engine oil, a gear oil, a hydraulic oil, and a grease.

25. A method for reducing the pour point of a lubricant composition, the method comprising adding the polymeric-inorganic nanoparticle of claim 1 to the lubricant composition.

26. A pour point depressant, comprising the polymeric-inorganic particles of claim 9.

* * * * *